US010725961B2

(12) United States Patent
Lund et al.

(10) Patent No.: US 10,725,961 B2
(45) Date of Patent: Jul. 28, 2020

(54) DEVICES AND METHODS FOR TRANSMISSION OF EVENTS WITH A UNIFORM LATENCY ON SERIAL COMMUNICATION LINKS

(71) Applicant: Microchip Technology Incorporated, Chandler, AZ (US)

(72) Inventors: Morten Werner Lund, Flatasen (NO); Lloyd Clark, Trondheim (NO); Odd Magne Reitan, Heimdal (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/371,880

(22) Filed: Apr. 1, 2019

(65) Prior Publication Data
US 2019/0227976 A1    Jul. 25, 2019

Related U.S. Application Data

(62) Division of application No. 15/970,726, filed on May 3, 2018.

(60) Provisional application No. 62/502,329, filed on May 5, 2017.

(51) Int. Cl.
| | |
|---|---|
| *G06F 13/36* | (2006.01) |
| *G06F 13/38* | (2006.01) |
| *G06F 13/40* | (2006.01) |
| *G06F 13/42* | (2006.01) |
| *G06F 9/54* | (2006.01) |
| *G06F 13/362* | (2006.01) |
| *G06F 3/041* | (2006.01) |
| *G09G 5/00* | (2006.01) |

(52) U.S. Cl.
CPC ........ *G06F 13/4291* (2013.01); *G06F 3/0412* (2013.01); *G06F 3/0418* (2013.01); *G06F 9/542* (2013.01); *G06F 13/3625* (2013.01); *G06F 13/4282* (2013.01); *G09G 5/006* (2013.01); *G09G 2370/08* (2013.01); *G09G 2370/10* (2013.01); *G09G 2370/12* (2013.01); *G09G 2370/14* (2013.01)

(58) Field of Classification Search
CPC ........... G06F 13/36; G06F 13/38; G06F 13/40
See application file for complete search history.

(56) References Cited

U.S. PATENT DOCUMENTS

| | | | |
|---|---|---|---|
| 5,621,898 A | 4/1997 | Wooten | |
| 7,417,637 B1 | 8/2008 | Donham et al. | |
| 7,634,603 B2 | 12/2009 | Edirisooriya et al. | |
| 7,668,202 B2 | 2/2010 | Gillet | |
| 7,800,408 B2 | 9/2010 | Stephens et al. | |

(Continued)

FOREIGN PATENT DOCUMENTS

EP    1465370 A1    10/2004

OTHER PUBLICATIONS

Written Opinion of the International Search Authority dated Oct. 1, 2018 for WO Application No. PCT/US18/030507.

(Continued)

*Primary Examiner* — David E Martinez
(74) *Attorney, Agent, or Firm* — TraskBritt

(57) ABSTRACT

The present disclosure relates generally to serial communication links and, more specifically, to events communicated on serial communication links and the timing of those events, for example, to achieve uniform delay among multiple event transmissions.

17 Claims, 20 Drawing Sheets

(56) References Cited

U.S. PATENT DOCUMENTS

| | | |
|---|---|---|
| 8,291,126 B2 | 10/2012 | Zitlaw |
| 8,639,851 B2 | 1/2014 | Laurentiu |
| 8,904,451 B2 | 12/2014 | Meijer et al. |
| 2002/0041592 A1 | 4/2002 | Van et al. |
| 2014/0320189 A1 | 10/2014 | Lund et al. |
| 2014/0372777 A1 | 12/2014 | Reller et al. |
| 2016/0147684 A1* | 5/2016 | Sengoku ............... G06F 13/24 710/105 |
| 2017/0228326 A1* | 8/2017 | Depeyrot ............ G06F 12/1425 |

OTHER PUBLICATIONS

Outgoing—ISA/210—International Search Report dated Oct. 1, 2018 for WO Application No. PCT/US18/030507.

\* cited by examiner

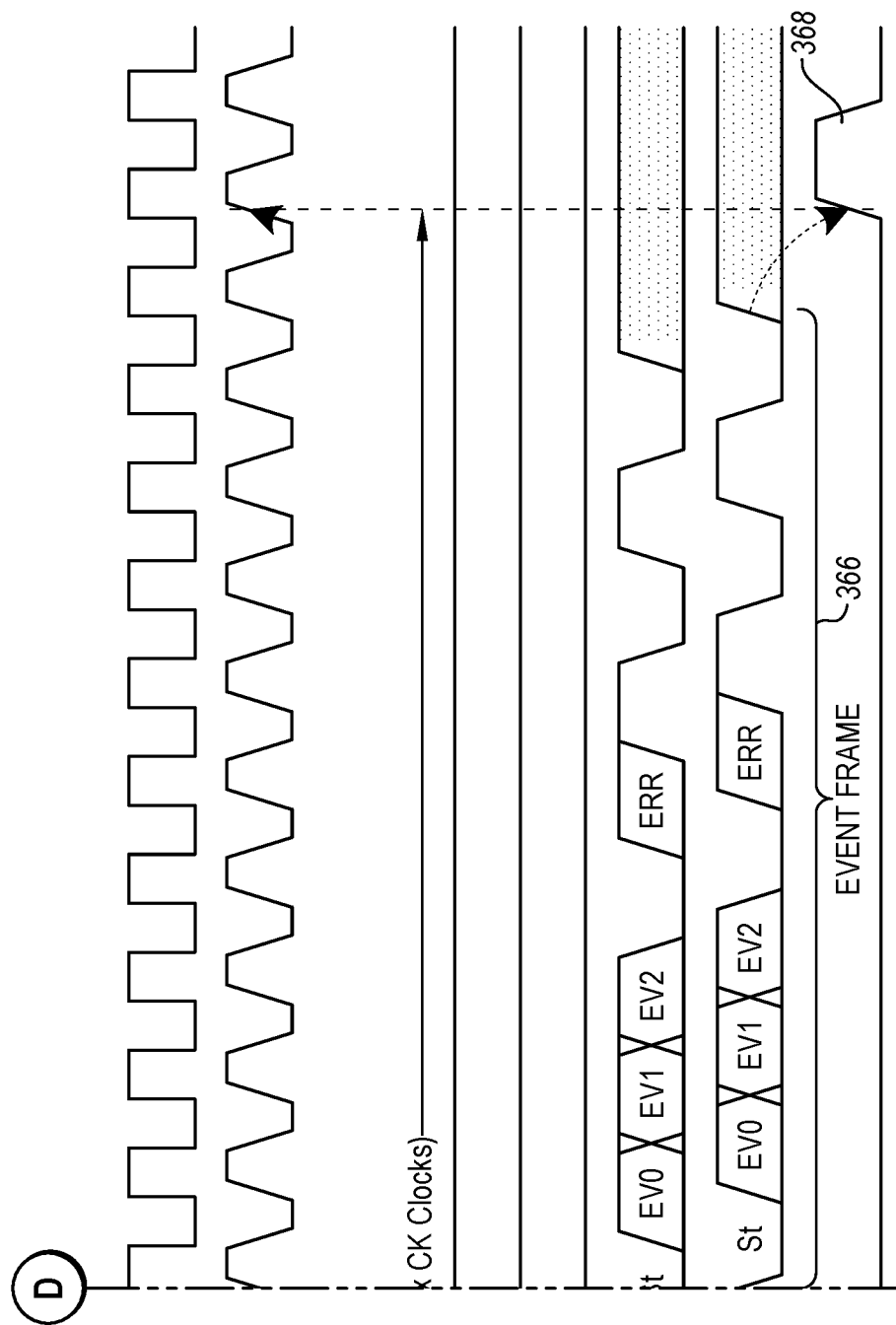

DEVICES AND METHODS FOR TRANSMISSION OF EVENTS WITH A UNIFORM LATENCY ON SERIAL COMMUNICATION LINKS

CROSS-REFERENCE TO RELATED APPLICATIONS

This application is a divisional of U.S. patent application Ser. No. 15/970,726, filed May 3, 2018, now U.S. Pat. No. 10,664,435, issued May 26, 2020, which application claims the benefit under 35 U.S.C. § 119(e) of U.S. Provisional Patent Application Ser. No. 62/502,329, filed May 5, 2017, the disclosure of each of which is hereby incorporated herein in its entirety by this reference.

TECHNICAL FIELD

Embodiments of the present disclosure relate generally to serial communication links and, more specifically, to events communicated on serial communication links and the timing of those events.

BACKGROUND

In many embedded control systems, and other computing systems, movement of data between peripheral devices and a host, or between peripheral devices, may be a significant amount of data traffic on the various buses that may exist in such systems. Moreover, some of this data traffic may include information related to events that occur and timing of these events.

In conventional inter-chip communication, one approach is to communicate such event information on dedicated lines signaling the events to manage the timing of the event communication. However, there is typically an extra cost for additional lines. The cost of adding lines might be high and even be prohibitive due to layout constraints. Another approach is to send the event information as soon as possible as the next communication packet on a serial communication link. However, this approach may lose important event details, for example, timing details about when an actual event occurred. Other deficiencies and limitations in these and other approaches may exist.

There is a need for communication of events and event timing details on serial communication links to indicate relative timing of events between a master and one or more slaves.

BRIEF SUMMARY

Some embodiments of the present disclosure relate, generally, to a serial communication link transmitter. The serial communication link transmitter may include delay circuitry and transmission circuitry. The delay circuitry may be configured to determine an event delay between a predefined bit position of an ongoing frame being transmitted and an event. The transmission circuitry may be configured to send an event frame after the ongoing frame, wherein the transmission circuitry is configured to include in the event frame, delay bits corresponding to the event delay and event identifier bits indicative of the event to which the event frame corresponds.

Some embodiments of the present disclosure relate, generally, to a method of transmitting events over a serial communication link. The method may include determining an event delay between a predefined bit position of an ongoing frame being transmitted and an event; encoding an event frame corresponding to the event, wherein the event frame includes: delay bits corresponding to the event delay; and event identifier bits that indicate the event frame corresponds to the event, and transmitting the event frame after the ongoing frame.

Some embodiments of the present disclosure relate, generally, to a serial communication link receiver. The serial communication link receiver may include a receive circuitry and a delay circuitry. The receive circuitry may be configured to receive an event frame. In one embodiment, the event frame includes delay bits indicative of a delay between an event that occurred at a transmitter relative to a predefined bit position in a previous frame received from the transmitter. The delay circuitry may be configured to decode the delay bits; wait a number of clock cycles corresponding to the delay bits; and assert a receiver-side event after waiting the number of clock cycles.

Some embodiments of the present disclosure relate, generally, to a method of receiving events over a serial communication link. The method may include receiving an event frame; decoding delay bits from the event frame, the delay bits indicative of a delay between an event that occurred at a transmitter relative to a predefined bit position in a previous frame; waiting a number of clock cycles corresponding to the delay bits; and asserting a receiver-side event after the waiting.

Some embodiments of the present disclosure relate, generally, to a serial communication link. The serial communication link may include a transmitter and a receiver configured to define a uniform latency between a transmitter-side event and a receiver-side event. The transmitter may include delay circuitry, control circuitry, and transmission circuitry. The delay circuitry may be configured to receive the transmitter-side event and delay the transmitter-side event by a delay time corresponding to a frame time. The control circuitry may be configured to prevent additional frames from being started while the transmitter-side event is being delayed. The transmission circuitry may be configured to send an event frame corresponding to the transmitter-side event after the delay time, wherein the transmission circuitry is configured to include in the event frame, event identifier bits indicating the frame being transmitted is an event frame. The receiver may include receiver circuitry configured to decode the frame being transmitted as the event frame; and assert the receiver-side event responsive to the decoding.

BRIEF DESCRIPTION OF THE DRAWINGS

Advantages of the embodiments of the disclosure will be apparent to those of ordinary skill in the art from the following detailed description and the accompanying drawings:

FIGS. 3E and 3F show marked sections of FIG. 3D in an expanded view.

DETAILED DESCRIPTION

Figure 1A:
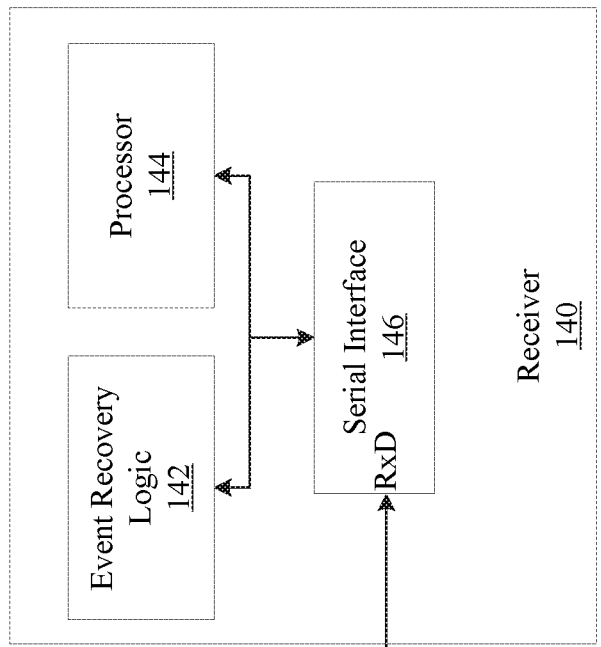
FIG. 1A shows a block diagram of a transmitter and a receiver with a serial communication link, according to an embodiment of the disclosure.
Figure 1A:
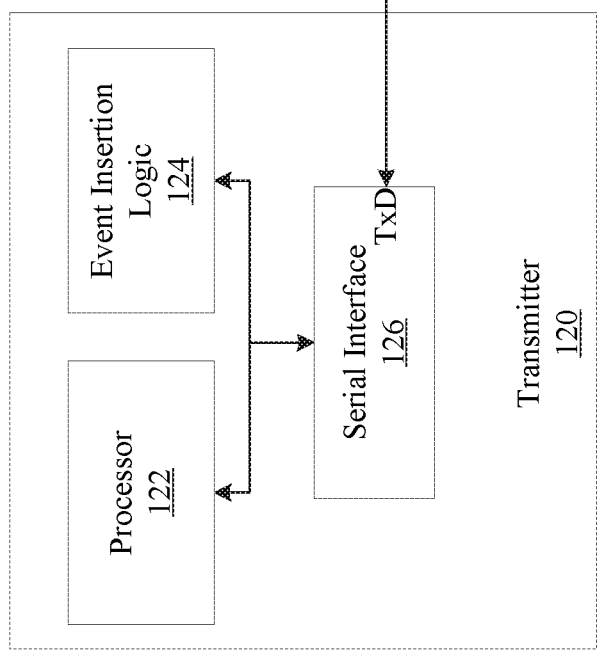

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

In an effort to make details in figures clearer, certain marked sections of some figures may be shown in an expanded view in another figures. In some cases section markings may obscure parts of a figure, but will be clear in the expanded view. Everything shown in an expanded view should be considered part of the corresponding figure, even some details that might be obscured in the corresponding figure by the section markings. Further, any discussion of a figure in this disclosure also applies to its expanded views, if any.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, "serial communication link" means a communication link that transmits information as a serial group of bits. The protocol of the link includes a group of bits as an information payload, which may be of various sizes and may include other bits such as, for example, start bits, stop bits, parity bits, and address bits. The physical layer of the link may be a wired bus, such as, for example, RS-232, I$^2$C, and SMBus. The physical layer of the link also may be wireless signals such as, for example, Infrared Data Association (IrDA) signals.

As used herein, the term "frame" defines a group of predetermined number of bits transferred on a serial communication link. As one example, in serial communication links such as a Universal Asynchronous Receiver/Transmitter (UART), a Universal Synchronous Receiver/Transmitter (USRT), or a Universal Synchronous/Asynchronous Receiver/Transmitter (USART), a frame may be defined as 10 bits to include a start bit, an 8-bit data payload, a parity bit, and a stop bit. The frame for one of these serial communication protocols may also be different lengths, such as, for example only, 8 bits to include a start bit, a 7-bit data payload, and a stop bit. As another example, an I$^2$C serial communication protocol (or other protocols with multiple slave devices) may include longer frame sizes to allow inclusion of a slave address as well as a data payload.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Some embodiments described herein relate to techniques for providing a uniform latency between an occurrence of an event at a bus master and its reception at a slave. In some embodiments, the event is communicated on a serial bus and the indicator of the event arrives at a slave coupled to the serial bus. In some embodiments, the uniform latency may be a fixed delay already known between the master and the slave. In other embodiments, the uniform latency may be communicated between the master and slave with timing information included. Still other embodiments described herein provide prioritization of multiple events that may occur during any given frame.

In dedicated serial communication systems, there is sometimes a need for transmitting "side information" of certain occurrences (e.g., events) between regular data communication packages (the transmission of the side information is referred to, herein, as "event transmission"). The event transmission should not destroy the main data communication packages, but the event transmissions should still identify uniquely the time of the event. As an example, the communication link may be based on a UART, or its synchronous version USRT, and the communication may be a U(S)ART frame.

Further, if a system supports multiple such events, then the system, according to one embodiment of the disclosure, will prioritize if two or more events occur too frequently (e.g., close in time) to be transmitted in individual frames and still provide the correct timing information. The present disclosure describes systems, devices and methods to prioritize these events in a way that seeks to ensure the highest priority event is transmitted even if a lower priority event comes first, but too close in time to be able to complete the transmission of the low priority event before one has to start the transmission of the high priority event.

Even though the main purpose of a communication link may be to transfer a certain type of data, the transmitter may need to inform the receiver of certain events taking place at the transmitter. A non-limiting system example is a microcontroller (MCU) controlling multiple complex display drivers on a display, such as, for example, a Liquid Crystal Display, (LCD), an Organic Light-Emitting Diode (OLED) display, etc. The display drivers might have complex circuitry for capacitive touch measurement requiring configuration and control by the MCU. Timing information (e.g., events) like horizontal synchronization (HSYNC) and vertical synchronization (VSYNC) might be necessary to time (e.g., synchronize) touch operations to the update rate of the display, for example, to compensate for the noise introduced by the display drivers.

Although embodiments of the disclosure may refer to "events," e.g., "event frame," "event insertion logic," "event recovery logic," the term "event" is not limited to an event driven system and is intended to encompass side information, generally, including side information about the regular data that is transferred from a transmitter to a receiver.

FIG. 1A is a block diagram of a transmitter 120 and a receiver 140 with a serial communication link 130 according to an embodiment of the present disclosure. In one embodiment, the transmitter 120 and receiver 140 may be a master and a slave configured for synchronous communication over, for example, a serial peripheral interface. The transmitter 120 may include a processor 122, event insertion logic 124, and serial interface 126. The processor 122 may be configured to send regular data to the receiver 140 over the communication link 130. The event insertion logic 124 may be configured to provide event information to the receiver 140 using the communication link 130. The event information may be related to events that are created at the transmitter 120 or, in another embodiment, event information provided to the transmitter 120 about events external to the transmitter 120. By way of non-limiting example, event information may include timing information, event type information, status information, etc. In various embodiments, the event insertion logic 124 may be configured to insert the event into a serial communication stream encoded at the serial interface 126 and transmitted on the communication link 130. The serial interface 126 and serial interface 146 may be configured to translate data into frames for transfer over the communication link 130, as well as recover data from transmitted frames. Some routine elements related to synchronous communication are not shown to simplify FIG. 1A, such as the clock (Ck) line.

On the receiver 140 side, the receiver 140 may include event recovery logic 142, a processor 144, and a serial interface 146. The event recovery logic 142 may be configured to recover event information according to the various embodiments described in this disclosure.

While the embodiments described with reference to FIG. 1 relate to synchronous communication, one of ordinary skill in the art would understand that the principles are applicable to asynchronous communication.

A general description of processes for transmission of event frames follows, with reference to FIGS. 1B to 1E.

Figure 1B:
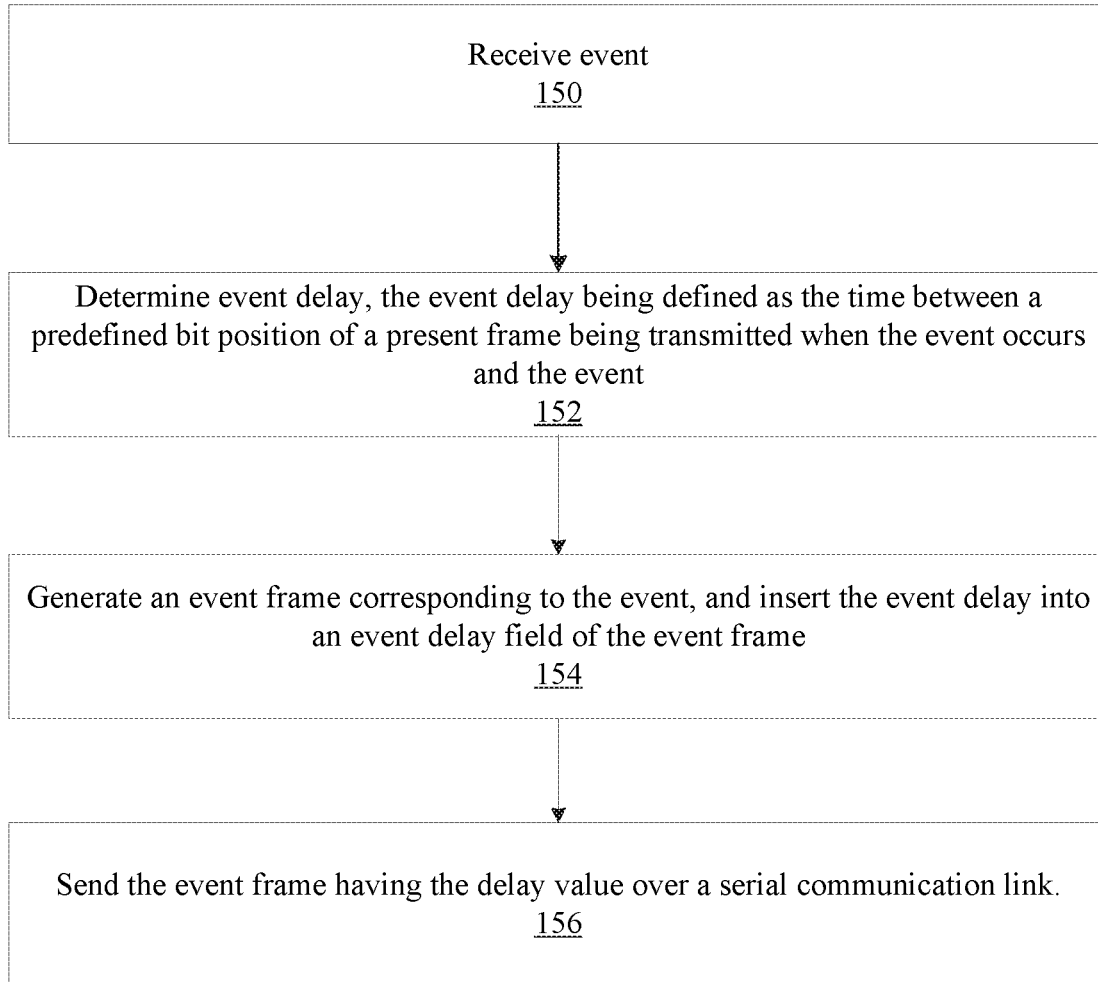
FIGS. 1B-1E show flowcharts showing processes for transmission of events over a serial communication link, according to embodiments of the disclosure.

FIG. 1B shows a flowchart of an event transmission with uniform delay based on a transferred delay value according to an embodiment of the disclosure. In operation 150, an event is received. The event may be related to an event generated at a transmitter or be received by the transmitter for an external event. In operation 152, an event delay is determined, the event delay being defined as the time between a predefined bit position of a present frame being transmitted when the event occurs and the event. In operation 154, the event frame corresponding to the event is generated and the event delay is inserted into an event delay field of the event frame. By way of non-limiting example, the delay value may be a clock count or a value from which a time or clock count is recoverable. In one embodiment, the delay value may indicate where in the present frame (i.e., the ongoing frame) the event occurred compared to a predefined point in the present frame (e.g., the start of the present frame, the end of the frame, etc.). If there was no ongoing transmission or the event frame was otherwise not delayed then the delay value may be indicative of no delay or "0." In operation 156, the event frame having the delay value is sent over a serial communication link. In one embodiment, if there was an ongoing frame then the event frame may be sent back-to-back with the ongoing frame.

Figure 1C:
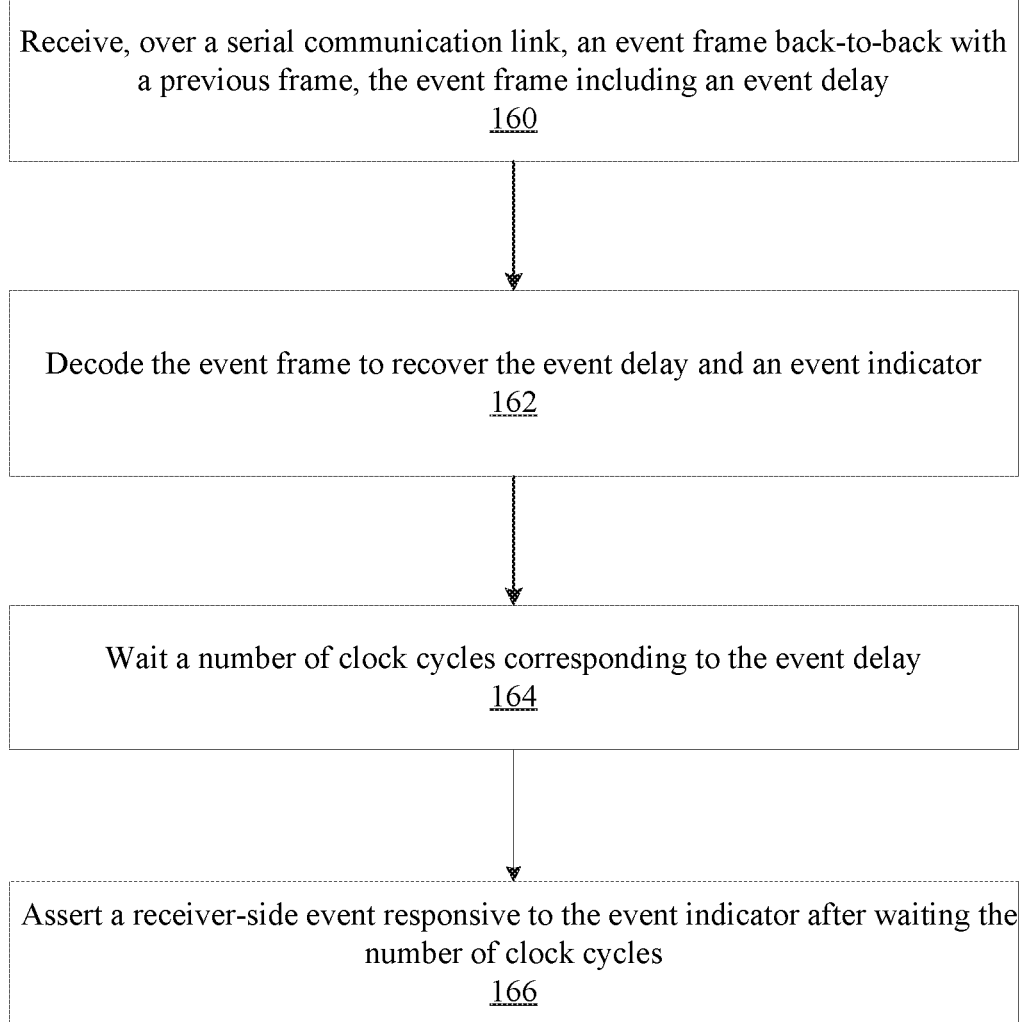

FIG. 1C shows a flowchart of an event transmission with uniform delay based on transferred delay value according to an embodiment of the disclosure. In operation 160, an event frame including an event delay is received over a serial communication link. In operation 162, the event frame is decoded to recover the event delay and an event indicator. In operation 164, a number of clock cycles corresponding to the event delay are waited. In operation 166, a receiver-side event is asserted responsive to the event indicator after waiting the number of clock cycles.

Figure 1D:
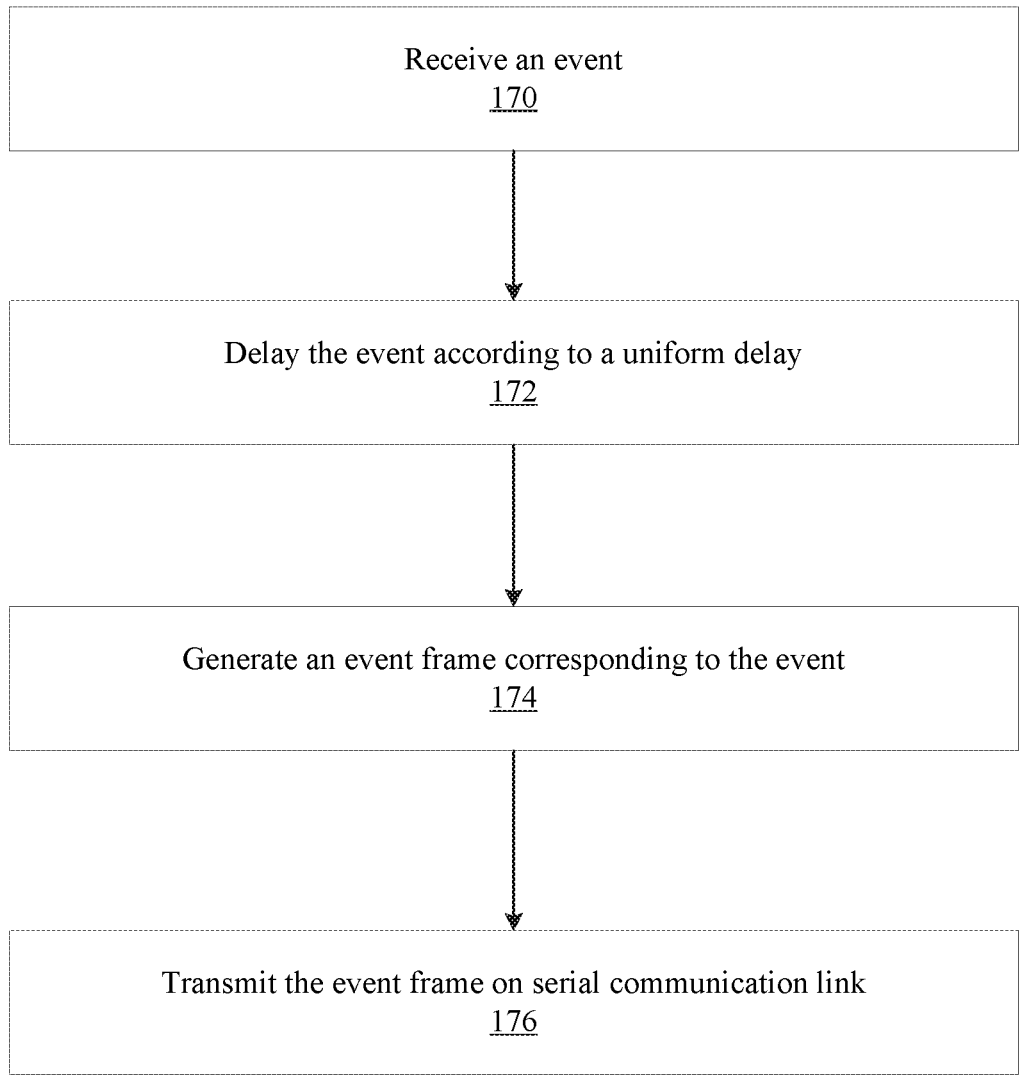

FIG. 1D shows a flowchart of an event transmission with uniform delay according to an embodiment of the disclosure. In operation 170, an event is received. The event may be received related to an event generated at a transmitter or be received by the transmitter for external event. In operation 172, the event is delayed according to a uniform delay. In one embodiment, the uniform delay may be the length of a frame. In operation 174, an event frame is generated that corresponds to the event. In one embodiment, the event frame may include an event indicator indicative of which event of a set of events the event frame corresponds to, and an event frame indicator indicating that that the event frame is, in fact, an event frame. In operation 176, the delayed event frame is transmitted on a serial communication link.

Figure 1E:
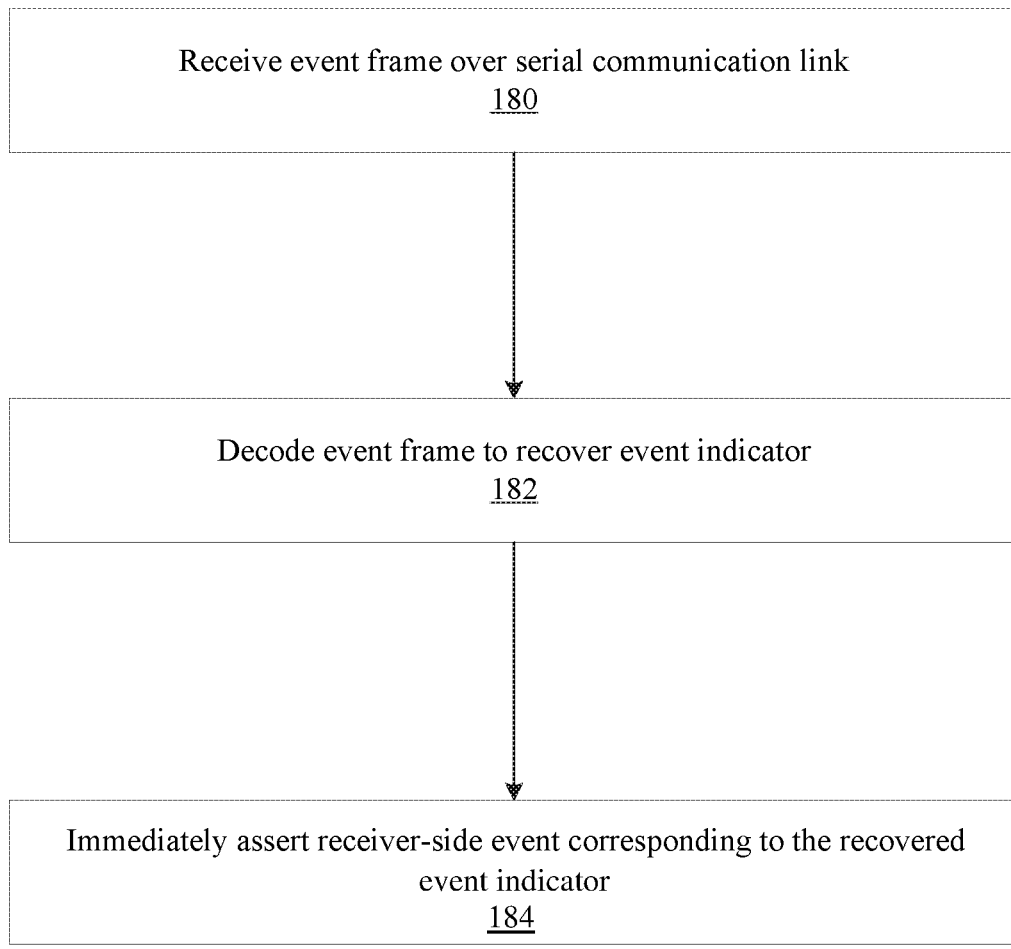

FIG. 1E shows a flowchart of an event transmission with uniform delay according to an embodiment of the disclosure. In operation 180, an event frame is received over a serial communication link. In operation 182, the event frame is decoded to recover an event indicator. In operation 184, a receiver-side event is immediately asserted responsive to the recovered event indicator.

One of ordinary skill in the art would understand that an event frame may comprise one or more fields. For example, a frame may have fields that comprise one or more bits, the one or more bits configurable to be indicative of the various information described in connections with the various embodiments of the present disclosure. One of ordinary skill in the art will recognize many permutations for the fields and the bits that comprise the fields.

Figure 2A:
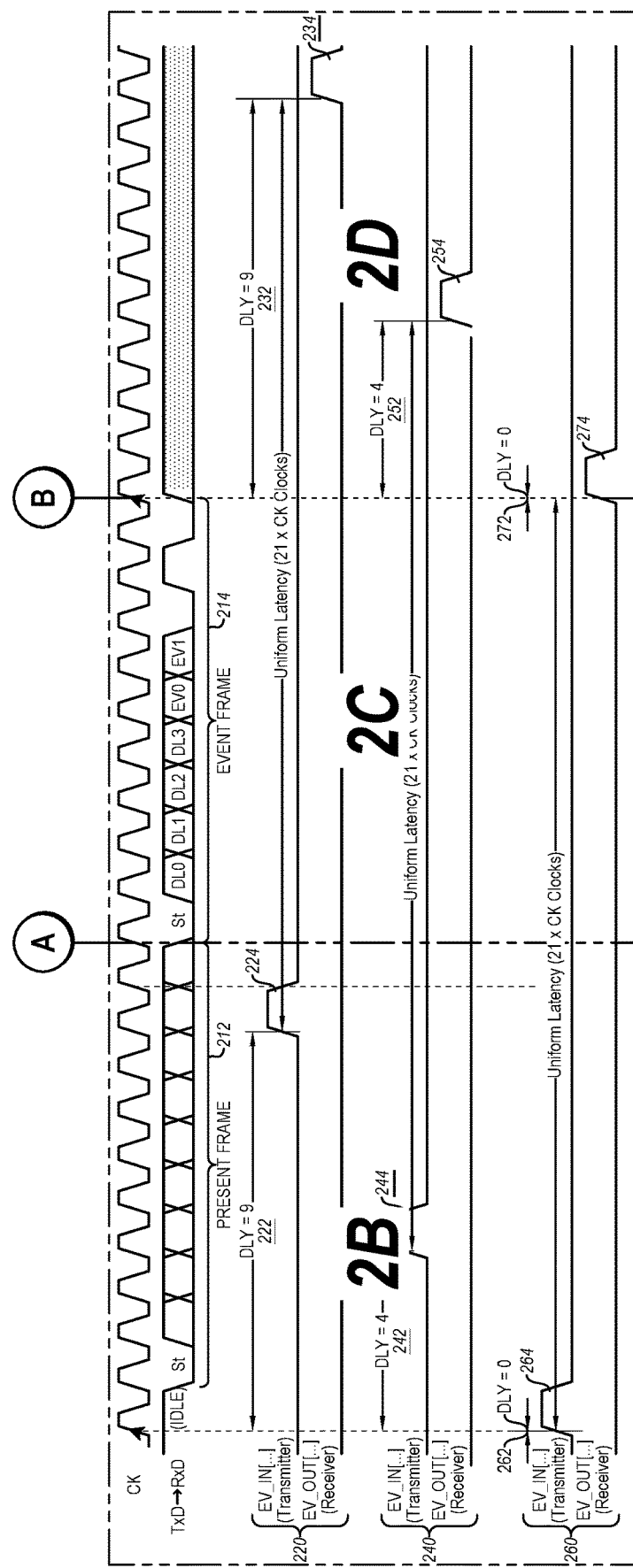
FIG. 2A shows a detailed timing diagram illustrating transmission of certain events over a serial communication link with a delay count included in the event transmission, according to embodiments of the disclosure.
Figure 2B:
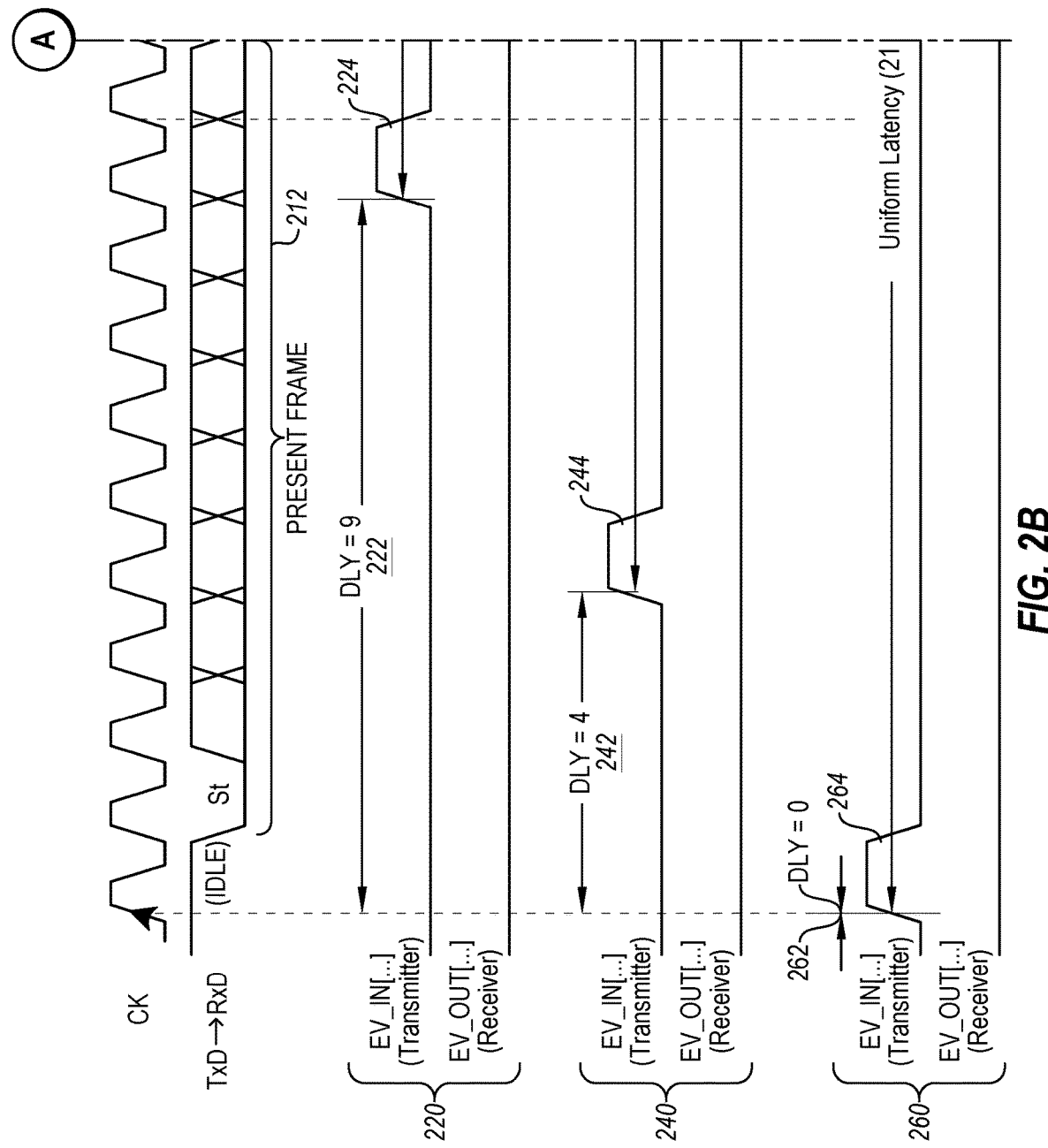
FIGS. 2B, 2C, and 2D show marked sections of FIG. 2A in an expanded view.
Figure 2C:
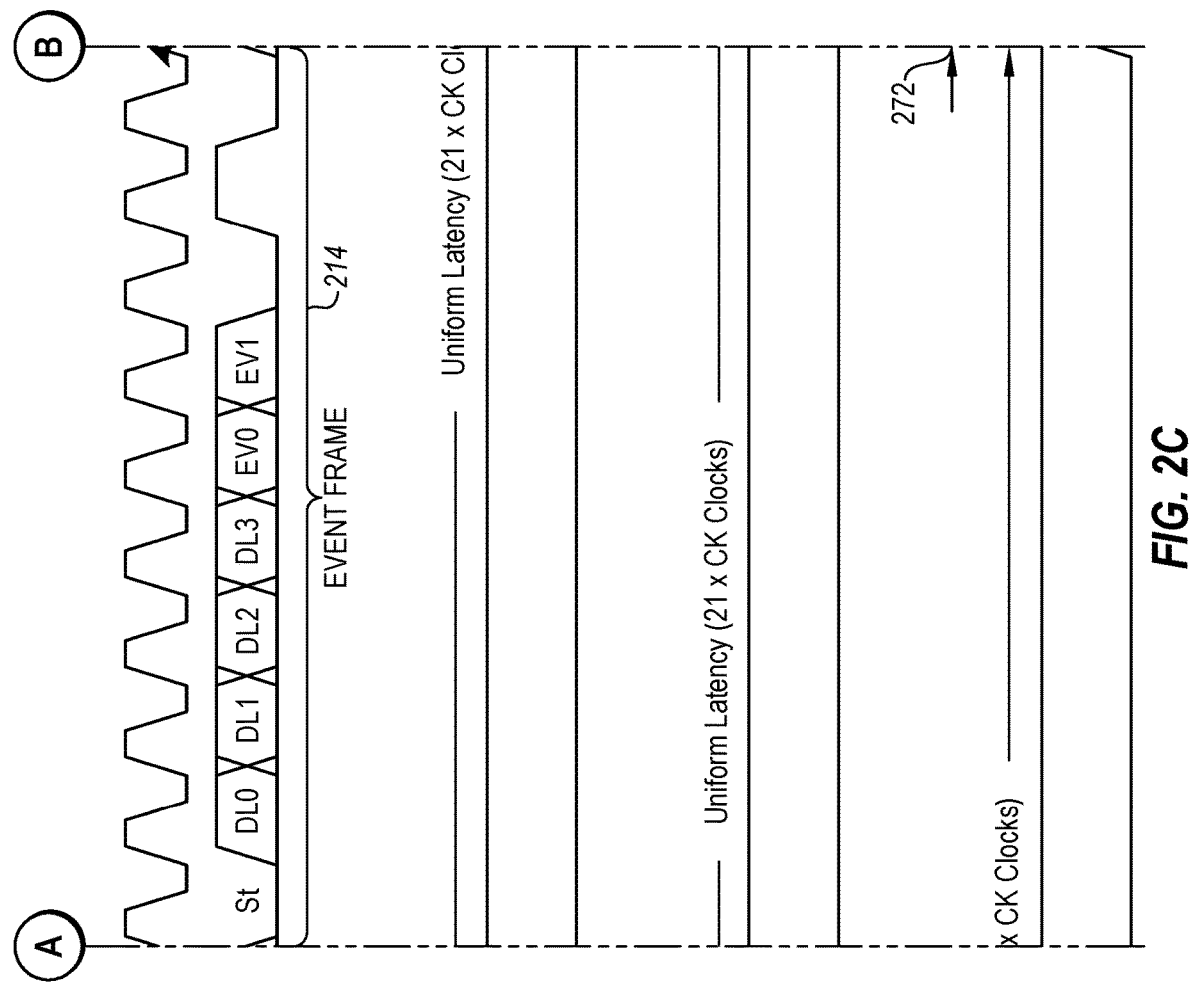
Figure 2D:
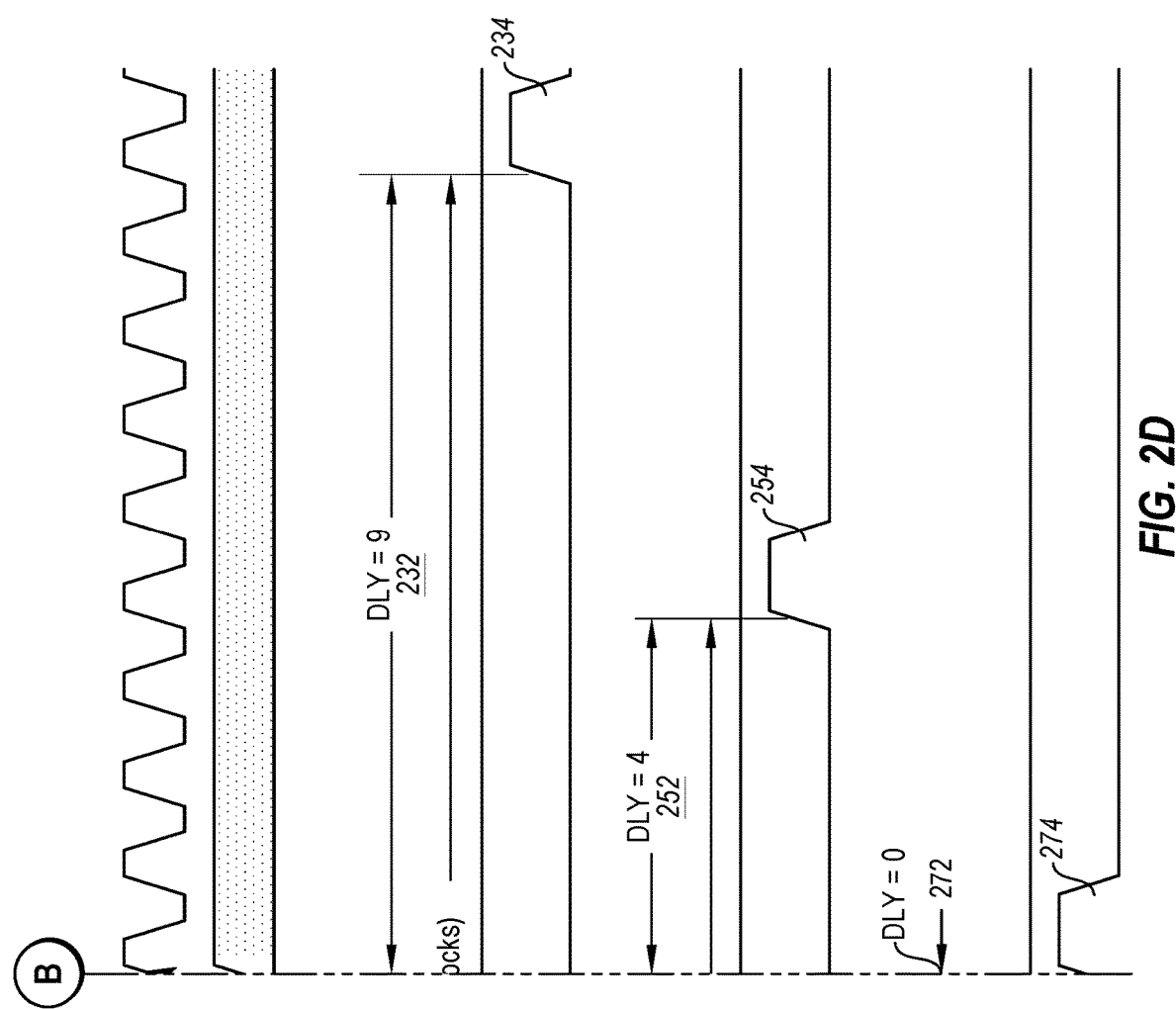

FIG. 2A is a detailed timing diagram illustrating transmission of certain events over a serial communication link with a delay count included in the event transmission (e.g., a transferred count value), according to an embodiment of the disclosure. For the discussion of FIG. 2A, FIGS. 2B-2D show marked sections of FIG. 2A in an expanded view in an effort to make the details of FIG. 2A easier to view. In this embodiment, when an event occurs, the event insertion logic 124 generates an event frame and the event frame is sent back-to-back (i.e., immediately after) with a present frame for which transmission is ongoing. The event frame contains a delay field that indicates where (or when) in the present frame (i.e., the ongoing frame) the event occurred compared to a predefined point in the present frame (e.g., the start of the present frame). Thus, if there is no ongoing frame transmission, the event frame is sent immediately with the delay value 0. The event frame has the highest priority, so it will be sent before other pending data frames.

FIG. 2A shows transmission of events with uniform delay based on transferred counter value for three different locations of the event relative to the present frame being transmitted. FIG. 2A shows as an example of a Universal Synchronous Receiver and Transmitter (USRT) where data is generated on the positive edge of the clock and the frame on the TxD line consists of a stop bit, 9 data bits, no stop bits, and the signal line being high represents an IDLE state. The clock and TxD signals are shown as the top two waveforms.

FIG. 2A shows three event transmission examples—signal group 220, signal group 240 and signal group 260—where events occur at delay time 9, 4, and 0 relative to the present frame shown on the TxD signal. The reference for time (DLY=0) shown as signal group 260 corresponds to the clock cycle prior to the start bit. By way of non-limiting example, the event may be a physical input pin or a software-generated event. In the case of a physical pin, the physical pins may be configured to generate an event on a rising edge, a falling edge, or a toggling signal value.

In an embodiment where the system supports multiple events, event insertion logic may be configured to encode an event number in the event frame (shown, for example, as EV0 and EV1 in FIG. 2A) together with a delay value (shown, for example, as DL0, DL1, DL2 and DL3 in FIG. 2A) in the event frame. In various embodiments, event numbers may be associated (at the transmitter and/or receiver side) with event sources, event sub-modules, types of events, predefined information associated with the foregoing, and more. With multiple events, several events may occur within (e.g., during) the same present frame. Depending on the application, this may be solved by event insertion logic 124 configured to: (1) in one embodiment, prioritizing one event and discarding the other event(s), (2) in another embodiment, prioritizing one event and sending the remaining event frame(s) back-to-back but with an ERROR bit (not shown in FIG. 2A) to indicate incorrect timing, or (3) in yet another embodiment, sending as two events, but reserving one of the delay values for error signature.

On the receiver side, the event recovery logic of the receiver may be configured to decode an event frame to find the event delay value (e.g., in clocks defined by rising and falling edges of Ck). The receiver then counts a number of clocks based on the event delay value from a predefined point in the received event frame and asserts the correct event line and the end of the delay. In the example shown in FIG. 2A, the event recovery logic counts from the last bit of the event frame. As shown, the events from the transmitter side are then recovered on the receiver side with a fixed latency of 21 clocks. In various embodiments, the fixed latency may be implemented with registers and the size of the fixed latency may depend, at least in part, on the number of registers in the data path, from where the counters start counting on the transmitter and receiver side, etc.

For signal group 220, a delay 222 between the start of present frame 212 and the occurrence of event 224 at transmitter (EV_IN) is 9 clocks. The event 224 gets transmitted out as an event frame 214 when the present frame 212 completes. At the end of the event frame 214, the receiver begins counting the number of clocks encoded in the event frame 214 as DL0-DL3 (9 clocks in this example) to create a delay 232. In one embodiment, the receiver may also use the event numbers EV0 and EV1 to determine the source of the event 224 for this event frame 214. When the count terminates, the receiver asserts a receive side event 234 (EV_OUT), which is a uniform latency of 21 clocks relative to when the event 224 originally occurred at the transmitter.

For signal group 240, a delay 242 between the start of the present frame 212 and the occurrence of event 244 at the transmitter (EV_IN) is 4 clocks. The event 244 gets transmitted out as an event frame 214 when the present frame 212 completes. At the end of the event frame 214, the receiver begins counting the number of clocks encoded in the event frame 214 on DL0-DL3 (4 in this case) to create a delay 252. The receiver may also use the event numbers EV0 and EV1 to determine the source of the event 244 for the event frame 214. When the count terminates, the receiver asserts a receive side event 254 at the receiver (EV_OUT), which is a uniform latency of 21 clocks relative to when the event 244 originally occurred at the transmitter.

For signal group 260, a delay 262 between the start of the present frame 212 and the occurrence of event 264 at the transmitter (EV_IN) is 0 clocks. The event 264 gets transmitted out as an event frame 214 when the present frame 212 completes. At the end of the event frame 214, the receiver begins counting the number of clocks encoded in the event frame 214 on DL0-DL3 (0 in this case) to create a delay 272. The receiver may also use event numbers EV0 and EV1 to determine the source of the event 264 for this event frame 214. When the count terminates, the receiver asserts a receive side event 274 at the receiver (EV_OUT), which is a uniform latency of 21 clocks relative to when the event 264 originally occurred at the transmitter.

One of ordinary skill in the art would understand that the delay bits and event number bits may be positioned differently relative to each other than described with reference to FIG. 2A. Moreover, other embodiments may use a different number of bits or different encodings for defining the event delay than described with reference to FIG. 2A. Also, other embodiments may use a different number of bits (including none) or different encodings for defining the source of the event than described with reference to FIG. 2A. As shown with bits in the event frame after the EV bits, the rest of the event frame (which may be positioned at various locations within the frame) includes a set of unique data bits that identify this frame as an event frame.

Thus, while FIG. 2A shows a specific serial communication link protocol according to an embodiment of the disclosure, other embodiments may include other protocols including various data sizes and various control bits, and a packet may include multiple physical frames, not only a single frame as shown in FIG. 2A.

Figure 3A:
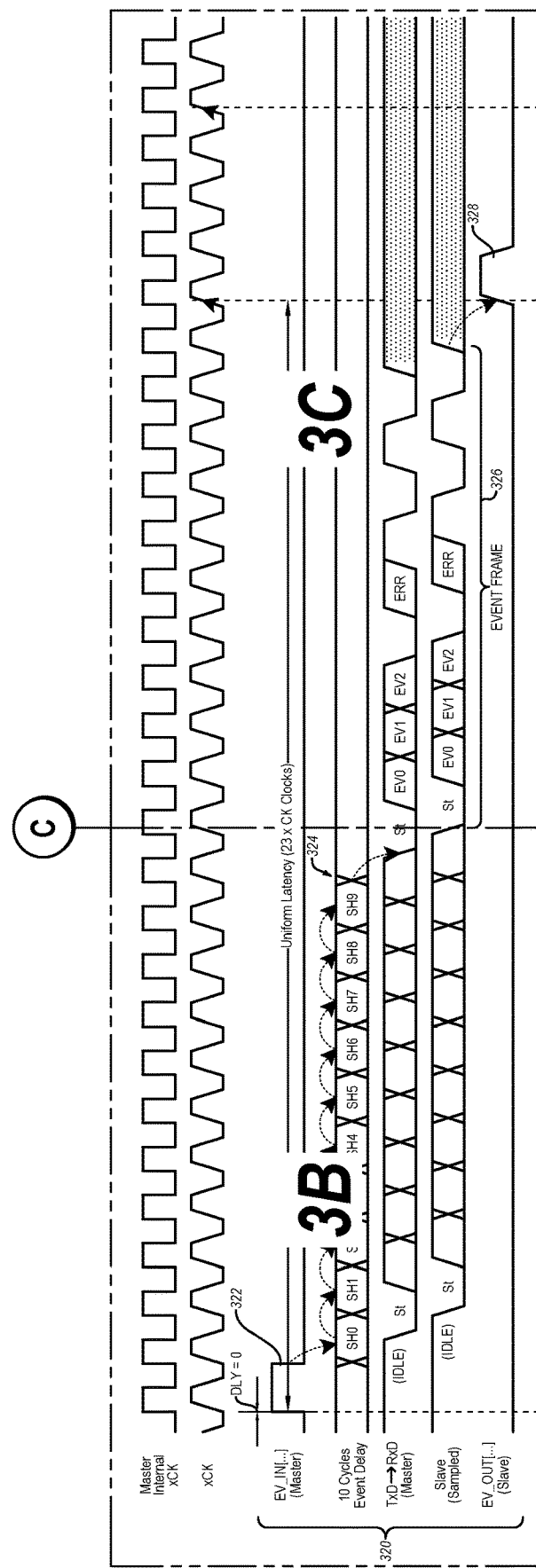
FIG. 3A shows a detailed timing diagram illustrating transmission of certain events over a serial communication link with a predetermined delay for the event transmission, according to embodiments of the disclosure.
Figure 3B:
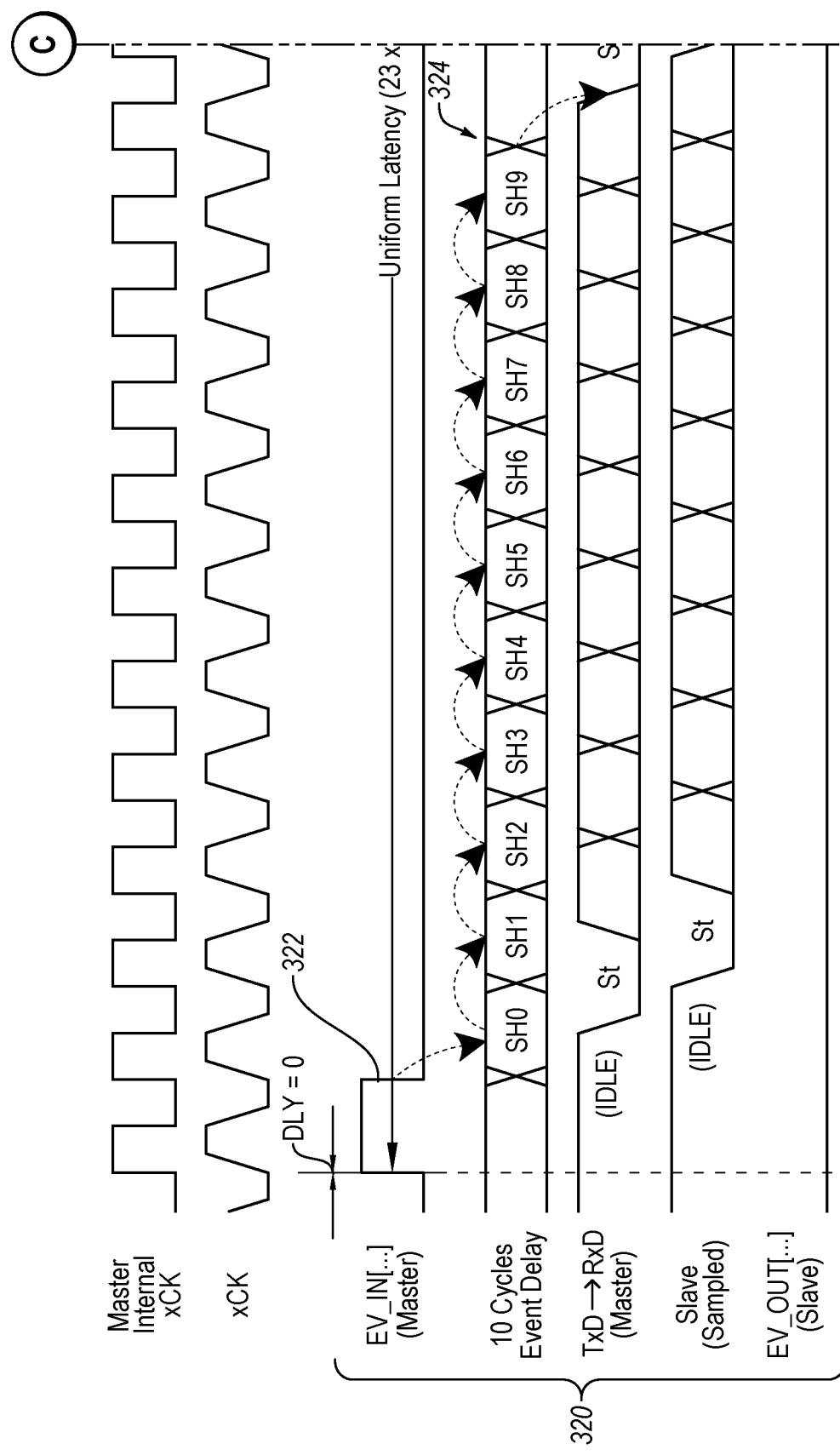
FIGS. 3B and 3C show marked sections of FIG. 3A in an expanded view.
Figure 3C:
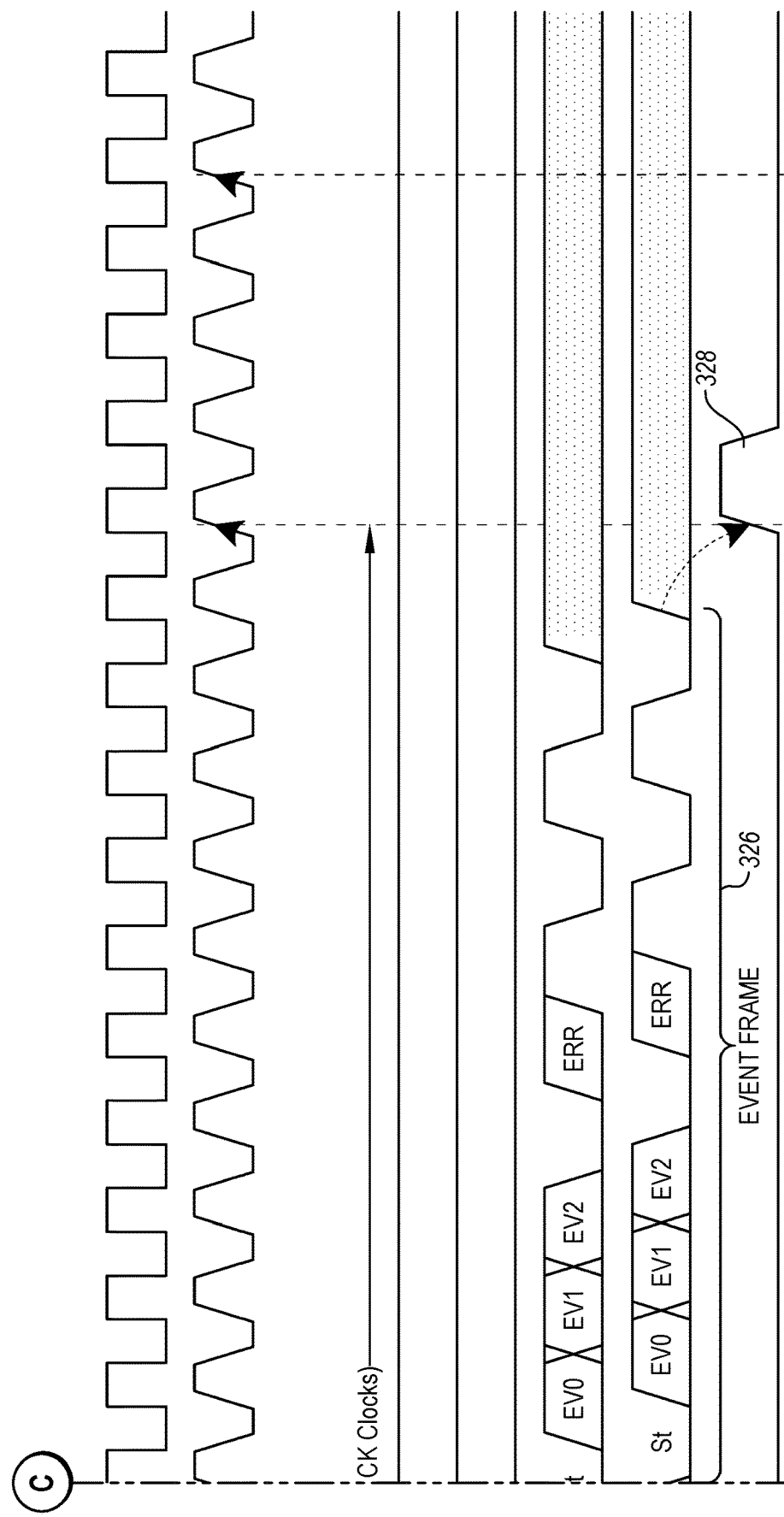

FIG. 3A shows a detailed timing diagram illustrating transmission of certain events over a serial communication link with a predetermined delay for the event frame transmission. In this embodiment, when an event occurs, the event may be stored at the transmitter for a time corresponding to the length of a frame/packet. For the discussion of FIG. 3A, FIGS. 3B and 3C show marked sections of FIG. 3A in an expanded view in an effort to make the details of FIG. 3A easier to view. As non-limiting examples, the event storage may be accomplished by putting the event into a shift register of this size, or by storing the event in a register bit while a counter counts down to zero. When the potentially ongoing frame is transmitted, the event frame has the highest priority such that no new frame is started until the delay times out and the event frame is generated. This delay ensures a uniform latency from the event occurrence at the transmitter until the event frame is received at the receiver.

FIG. 3A shows, as an example, a Universal Synchronous Receiver and Transmitter (USRT) where data is generated on the positive edge of the clock and the frame on the TxD line includes a stop bit, 9 data bits, and no stop bits, and the signal line being high represents an IDLE state.

FIG. 3A shows examples where events occur at time 0 (signal group 320) and at time 4 (signal group 360). The reference for time (DLY=0) corresponds to the clock cycle prior to the start bit. By way of non-limiting example, an event may be a physical input pin or a software-generated event. In the case of a physical input pin, the physical pins may be configured to generate the event on a rising edge, a falling edge, or a toggling signal value.

FIG. 3A also shows that for a synchronous communication protocol, the transmitter and receiver may operate at a different (higher) frequency than the communication link, and an event may need to be synchronized to the communication module. In an asynchronous communication protocol, a delay may be fixed from an event until an event frame is generated at a resolution of a system clock.

As with the embodiment discussed with reference to FIG. 2A, if a system using an embodiment of event transmission shown in FIG. 3A (or 3D) supports multiple events, an event number may be encoded in an event frame. With multiple events, the multiple events may occur within the same present frame. Depending on the application this may be solved by insertion logic configured to: (1) in one embodiment, prioritize one event frame and discard the other event frames, or (2) in another embodiment, prioritize one event frame and send the remaining event frames back-to-back but with an ERROR bit (shown as 'ERR' in FIG. 3A) to indicate that the latency may not be uniform.

On the receiver side, the receiver asserts its event output immediately (or after a fixed delay) when an event frame is received.

In the example in FIG. 3A, as shown, an event from the transmitter side is then regenerated on the receiver side with a uniform latency of 23 clocks relative to when the event actually occurred. The size of the uniform latency depends on number of registers in the data path, from where the counters start counting on the transmitter and receiver side, etc.

For signal group 320, the delay is shown as 0 clocks. Event 322 is delayed for an event delay frame 324 (e.g., 10 cycles) and is then transmitted out as an event frame 326 from the transmitter. The delay in the transmitter ensures that any ongoing frame being transmitted when the event 322 occurs is completed before (or at the same time as) the end of the delay. At the end of the event frame 326, the receiver asserts a receive side event 328 (EV_OUT), which is a uniform latency of 23 clocks relative to when the event 322 originally occurred at the transmitter.

Figure 3D:
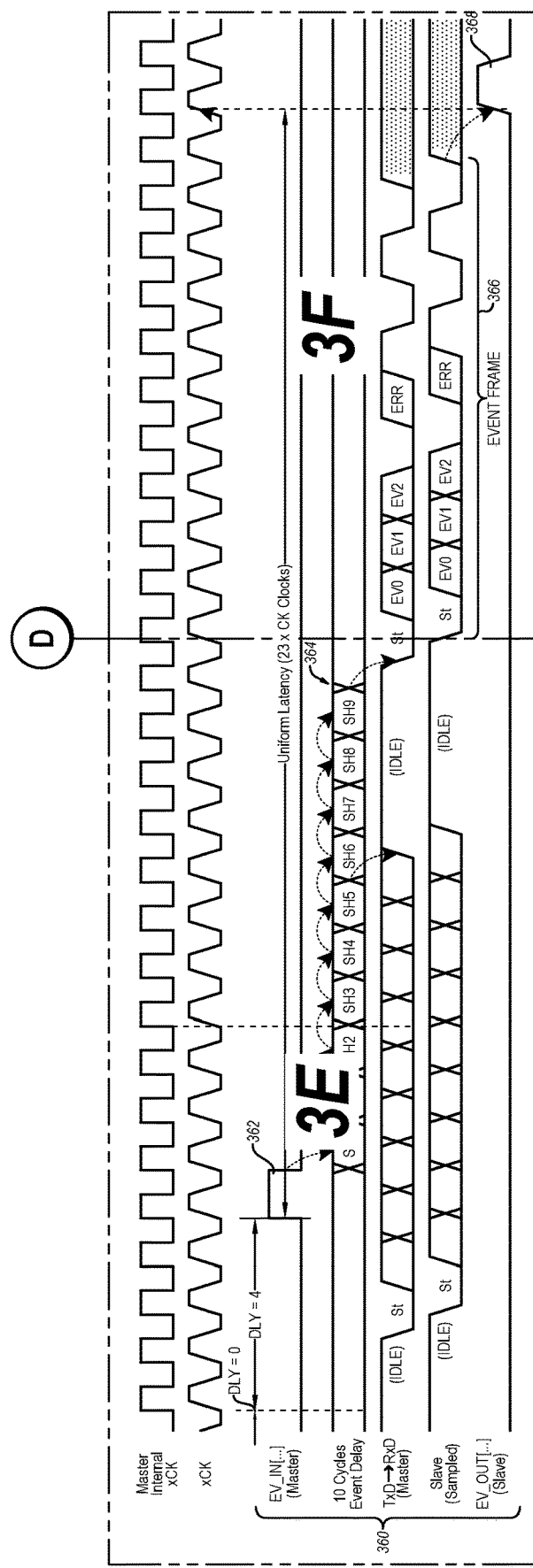
FIG. 3D shows a detailed timing diagram illustrating transmission of certain events over a serial communication link with a predetermined delay for the event transmission, according to embodiments of the disclosure.
Figure 3E:
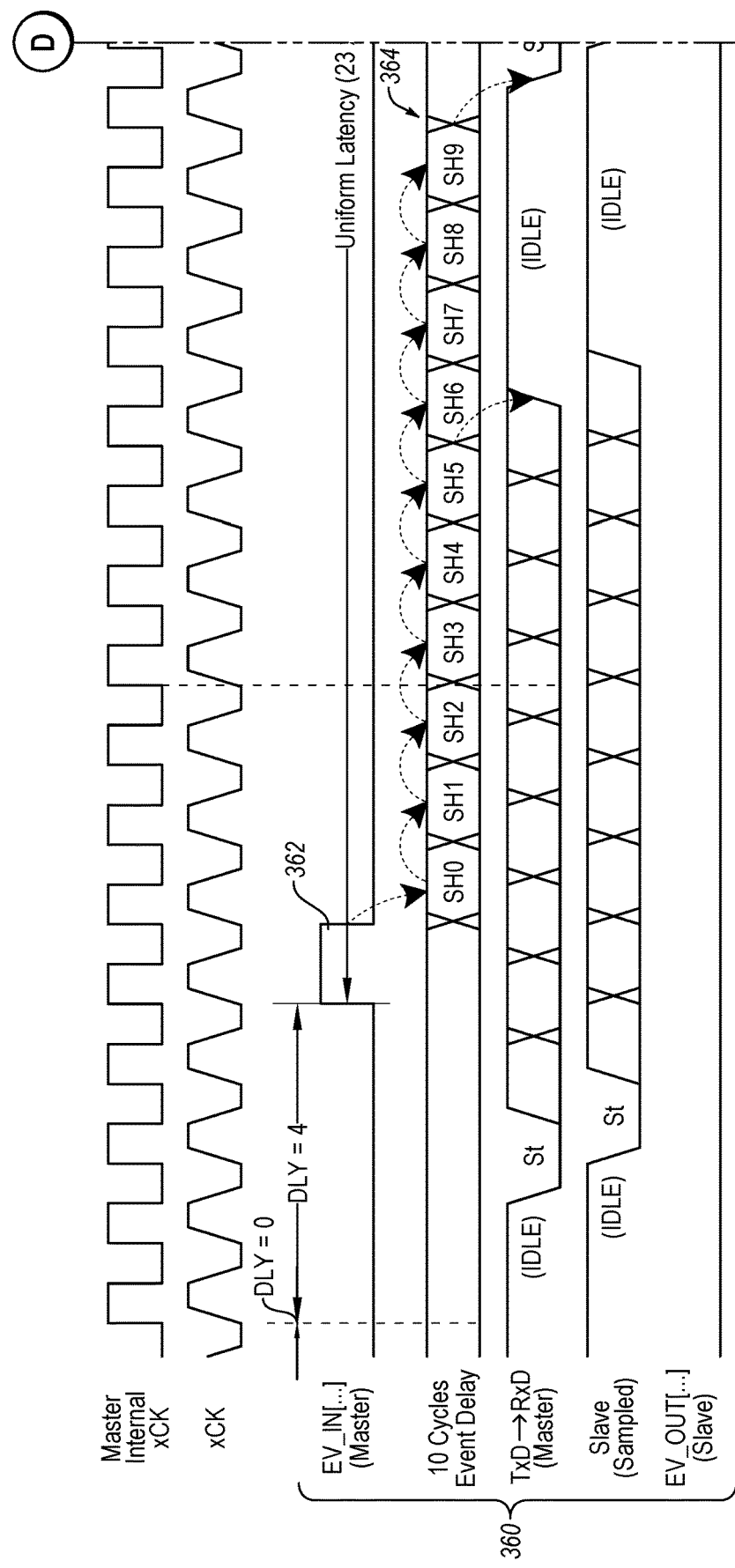

FIG. 3D shows another detailed timing diagram illustrating transmission of certain events over a serial communication link with a predetermined delay for the event frame transmission. For the discussion of FIG. 3D, FIGS. 3E and 3F show marked sections of FIG. 3D in an expanded view in an effort to make the details of FIG. 3D easier to view. For signal group 360, the delay is shown as 4 clocks. Event 362 is delayed for an event delay frame 364 (e.g., 10 cycles) and is then transmitted out as an event frame 366 from the transmitter. The delay in the transmitter ensures that any ongoing frame being transmitted when the event 362 occurs is completed before (or at the same time as) the end of the delay. Note that in this example, an idle period side event 368 occurs on the serial communication link between the frame being transmitted when the event 362 occurred and the event frame 366. At the end of the event frame 366, the receiver asserts a receive side event 368 (EV_OUT), which is a uniform latency of 23 clocks relative to when the event 362 originally occurred at the transmitter.

As discussed above with reference to FIG. 2A, the event frame may include bits, shown in event frame 366 as EV0-EV2, to indicate the source of the event 362 and a set of unique data bits that identify this as an event frame.

While FIGS. 3A and 3D illustrate a specific serial communication link protocol, other embodiments may include other protocols including various data sizes, numbers and types of control bits, different encoding schemes, and the packet may include multiple physical frames, not only a single frame as shown in FIGS. 3A and 3D.

In its various embodiments, the present disclosure enables communication of timing for events on serial communication links with no need for additional lines in addition to those required by the communication system. The event is perceived by a slave as a uniform latency from the occurrence at the transmitter side regardless of where it happens in the communication package.

A description of prioritization of event transmission follows with reference to FIGS. 4A-4C, FIG. 5 and FIGS. 6A-6C, according to embodiments of the disclosure. In one embodiment, prioritization logic may be part of event insertion logic, such as event insertion logic 124 (FIG. 1A).

Figure 4A:
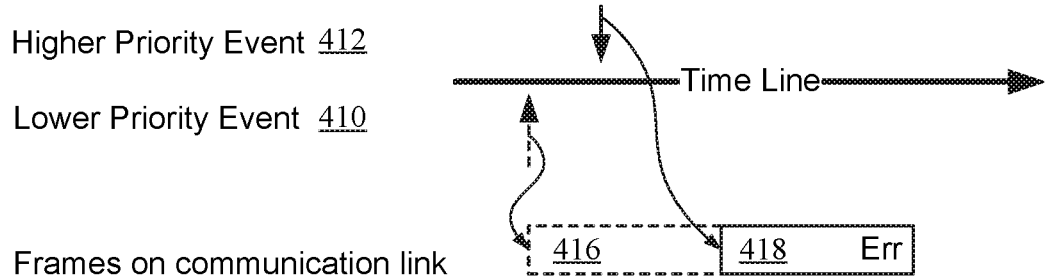
FIGS. 4A-4C show frame level timing diagrams illustrating different priority event timings and some errors that may occur over a serial communication link, according to embodiments of the disclosure.
Figure 4B:
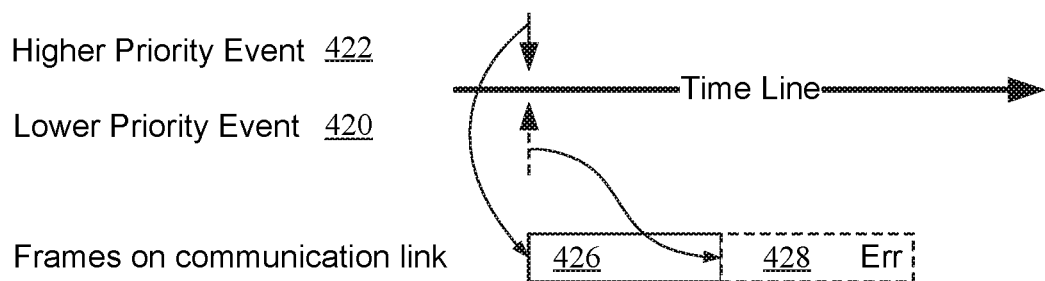
Figure 4C:
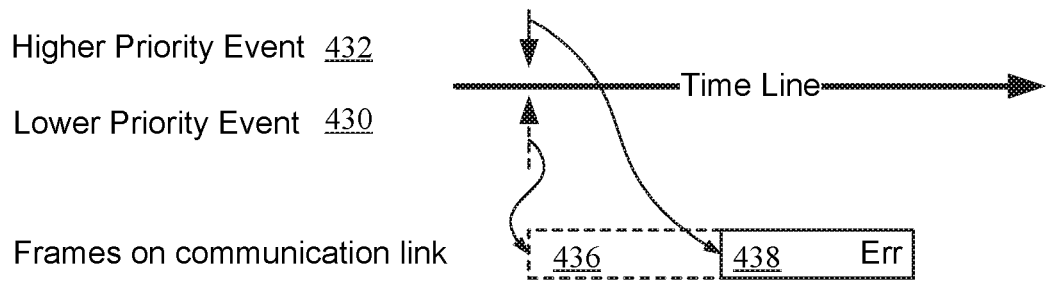

FIGS. 4A-4C show frame level timing diagrams illustrating different priority event timings and some errors that may occur over a serial communication link—errors addressed by embodiments of the present disclosure. The solid line arrows represent higher priority events and the dashed line arrows represent lower priority events. Similarly, the boxes with solid lines illustrate the communication frames containing information about the higher priority event and the boxes with dashed lines illustrate the communication frames containing information about the lower priority event.

In FIG. 4A, a lower priority event 410 occurs first. However, since communication frame 414 has a certain duration, sending the lower priority event 410 immediately when it occurs results in loss of a higher priority event 412 (at least it cannot have correct timing) even though it has higher priority, because the higher priority event 412 has to wait until a lower priority event frame 416 completes. Thus, although the lower priority event frame 416 may be sent with correct timing, a higher priority event frame 418 is sent with an error indication to indicate that there may be an inconsistency between the latency of when the higher priority event 412 occurred and when the higher priority event frame 418 is received.

In FIGS. 4B and 4C, the higher priority event and the lower priority event occur very close in time such that jitter in sampling of the event may produce a random order for when the event frames are transmitted. In FIG. 4B, a higher priority event 422 won so a higher priority event frame 426 is sent out first and at a proper time. Thus, a lower priority event 420 waits for the next frame and is sent with an error indication to indicate that there may be an inconsistency between the latency of when the lower priority event 420 occurred and when a lower priority event frame 428 is received. In FIG. 4C, a lower priority event 430 won so a lower priority event frame 436 is sent out first and at a proper time. Thus, a higher priority event 432 waits for the next frame and is sent with an error indication to indicate that there may be an inconsistency between the latency of when the higher priority event 432 occurred and when a higher priority event frame 438 is received.

One method to correct for these inconstancies in prioritizing events is to use transmit hardware (which may include software implementations) that creates a uniform latency by inserting a delay from the event equal to the frame length before sending the event frame, such as, for example, by using the embodiment illustrated in FIG. 3. The delay time may be used to force a correct priority.

In FIG. 3 the events are all delayed for one frame. When the delay duration times out, the transmitter checks if there are pending events in the pipeline of higher priority. If there are, the transmitter prioritizes the higher priority events by not starting any new frames until the higher priority event is ready to be transmitted, sends the high priority event, and then sends any events with lower priority afterward, and in the proper priority order—with an error flag set.

Figure 5:
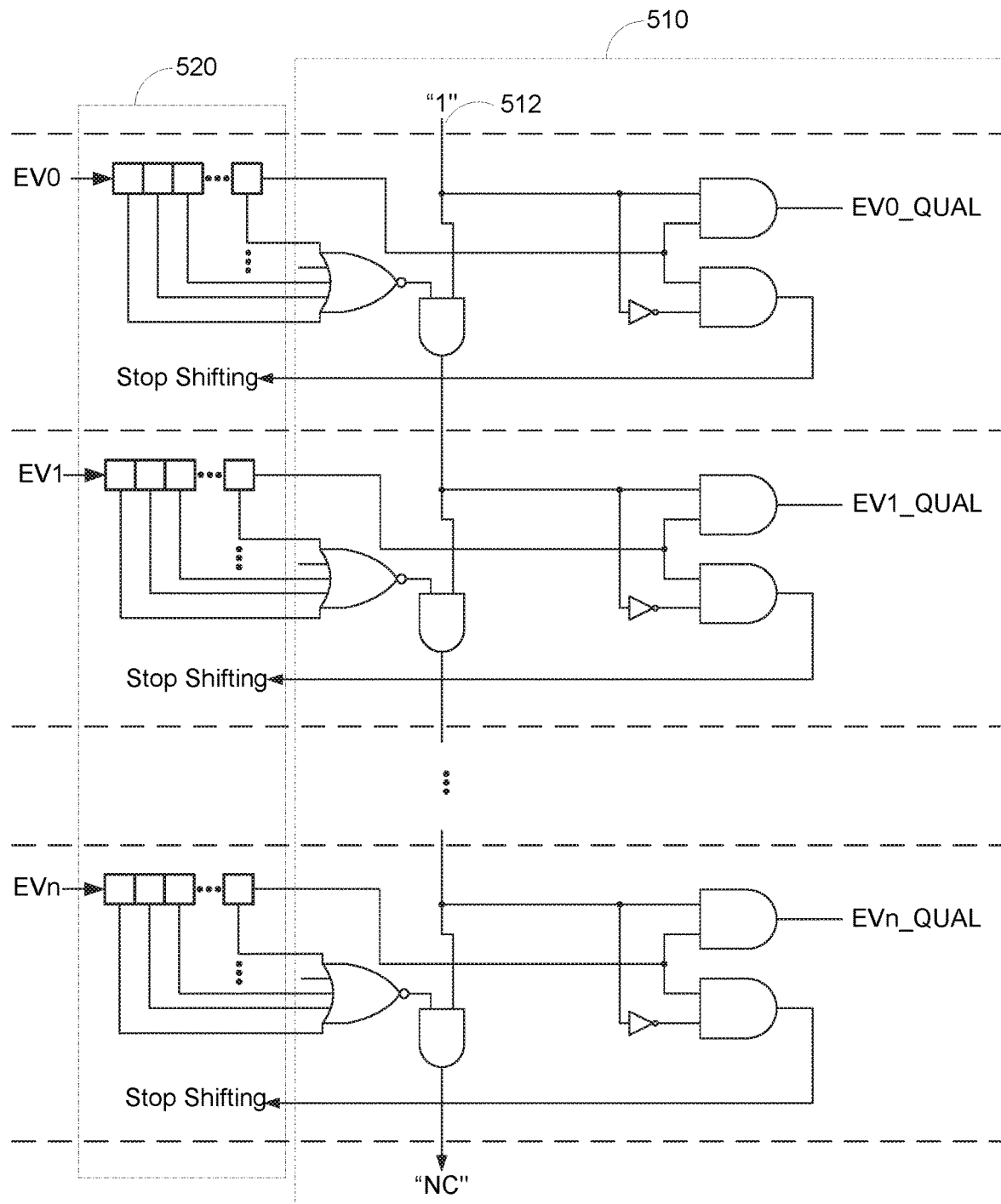
FIG. 5 shows a logic diagram illustrating priority logic as an example for prioritizing events on a serial communication link, according to embodiments of the disclosure.

FIG. 5 shows a logic diagram illustrating priority logic 510 as an example for prioritizing events on a serial communication link according to embodiments of the disclosure. FIG. 5 illustrates one possible implementation of this behavior; many other circuits and logical implementation may be used to accomplish the prioritization. The delay of events is illustrated in FIG. 5 as a delay circuit 520, here, shift registers. Event submodules (EV0, EV1, . . . EVn) are delineated in FIG. 5 by horizontal dashed lines. As stated above, counters may also be used for a delay. In this example, EV0 has the highest priority, while increasing event numbers have decreasing priority. The output from a NOR-gate for each event submodule indicates that there is no pending event at that event submodule. A vertical AND-line 512 qualifies each event by indicating at each submodule that there are no pending events with higher priority. If an event has reached the last stage of delay circuit 520, then the qualified event output is asserted if there are no pending events with higher priority. If there are pending events with higher priority, the delay circuit 520 for that event submodule is stopped until all events with higher priority have been transmitted. Thus, regardless of the arrival time of events EV0 through EVn, within a given data frame (or sequence of event frames) the highest priority event will be sent first followed by any pending lower priority events in the proper priority order.

Figure 6A:
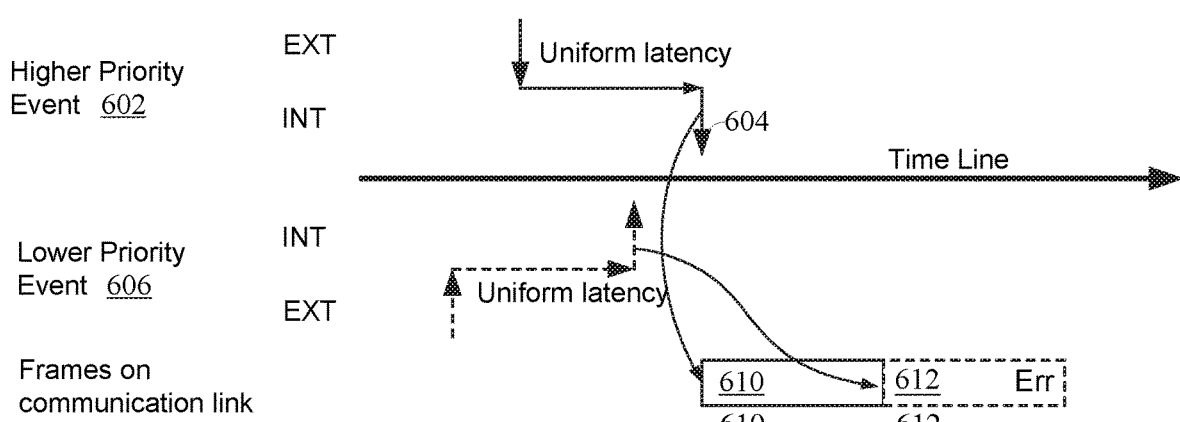
FIGS. 6A-6C show frame level timing diagrams illustrating event timings for prioritized events over a serial communication link, according to embodiments of the disclosure.
Figure 6B:
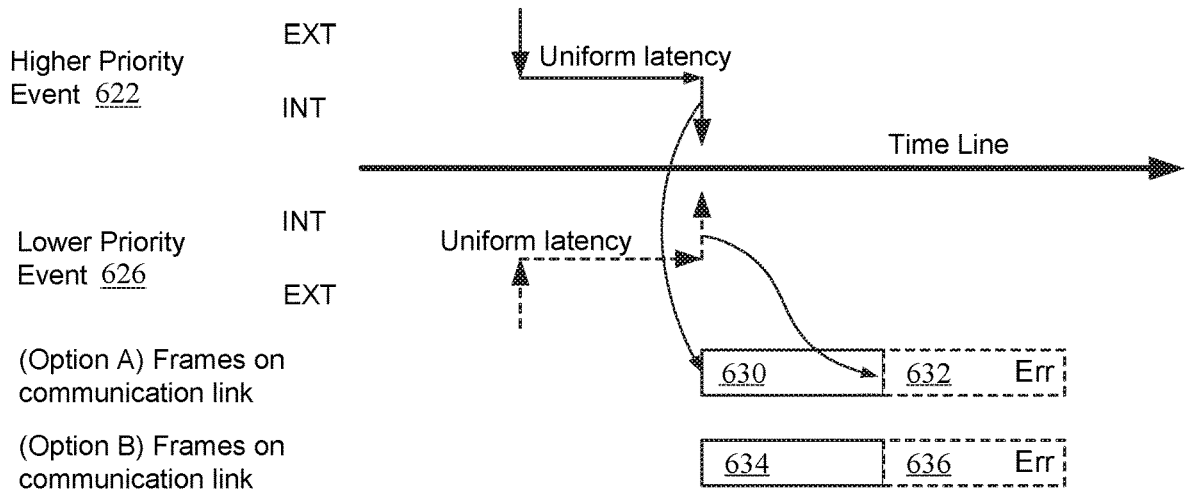
Figure 6C:
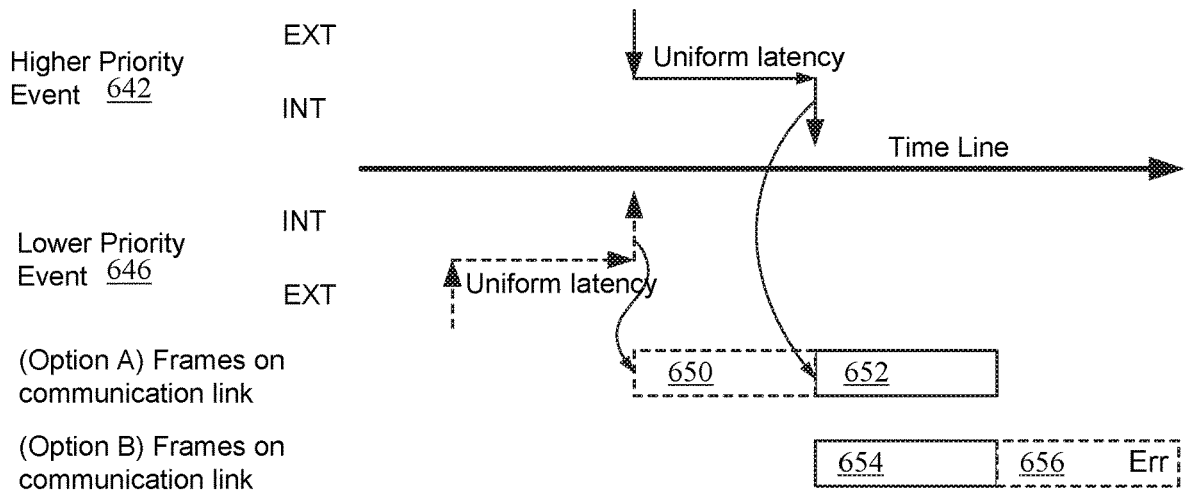

FIGS. 6A-6C are frame level timing diagrams illustrating event timings for prioritized events over a serial communication link. The solid lines represent higher priority events and the dashed lines represent lower priority events. Similarly, the boxes with solid lines illustrate the communication frames containing information about the higher priority event and the boxes with dashed lines illustrate the communication frames containing information about the lower priority event.

The timing in FIGS. 6A-6C show results that would be achieved for a higher priority event relative to a lower priority event using the uniform delay prioritization discussed with reference to FIG. 5. In FIGS. 6A-6C EXT indicates when the event actual occurs as input to the priority logic and INT indicates when the event would be available for transmission (i.e., at the end of the shift register creating a uniform one frame delay).

FIG. 6A illustrates a situation where a higher priority event 602 (solid lines) occurs after a lower priority event 606 (dashed lines)—but too close in time to be sent in different frames. A delayed higher priority event 604 (INT) wins in the priority logic and will be sent out as a higher priority event frame 610 when the uniform delay is over and will thus be received with a uniform latency relative to when the higher priority event 602 occurred at the transmitter. The lower priority event 606 lost in the priority logic and will thus be sent as a lower priority event frame 612 after the higher priority event frame 610 with an error indication to indicate that there may be an inconsistency between the latency of when the lower priority event 606 occurred and when the lower priority event frame 612 is received.

FIG. 6B illustrates a situation where the two events (higher priority event 622 and lower priority event 626) happen simultaneously or almost simultaneously. Timing jitter in the sampling process determines which event is first registered. However, when the first occurring event has been delayed for one frame, the priority logic checks for pending higher priority events. This way, the higher priority event 622 always wins.

As shown in FIG. 6B, Option A indicates that at the time of sampling the events, the higher priority event 622 was sampled first and a higher priority event frame 630 for the higher priority event 622 was sent out after the uniform delay and will thus be received with a uniform latency relative to when the higher priority event 622 occurred at the transmitter. The lower priority event 626 lost in the priority logic and will thus be sent as a lower priority event frame 632 after the higher priority event frame 630 with an error indication to indicate that there may be an inconsistency between the latency of when the lower priority event 626 occurred and when the lower priority event frame 632 is received.

Also as shown in FIG. 6B, Option B indicates that at the time of sampling the events, the lower priority event 626 was sampled first. However, because the higher priority event 622 wins in the priority logic, a higher priority event frame 634 for the higher priority event 622 was sent out after the uniform delay and will thus be received with a uniform latency relative to when the higher priority event 622 occurred at the transmitter. The lower priority event lost 626 in the priority logic and will thus be sent as a lower priority event frame 636 after the higher priority event frame 634 with an error indication to indicate that there may be an inconsistency between the latency of when the lower priority event 626 occurred and when the lower priority event frame 636 is received.

FIG. 6C illustrates yet another issue. If a higher priority event 642 occurs one frame later relative to a lower priority event 646, we may have a situation where jitter in the sampling time will determine transmission order. In Option A, the lower priority event 646 is sampled first and its event frame 650 may be transmitted without latency error and a higher priority event frame 652 for the higher priority event 642 is transmitted next without latency error. In Option B, the higher priority event 642 is sampled first and its priority event frame 654 may be transmitted without latency error. However, a lower priority event frame 656 will be sent after the higher priority event frame 654 with an error indication to indicate that there may be an inconsistency between the latency of when the lower priority event 646 occurred and when the lower priority event frame 656 is received. In either option, the higher priority event frame 652 or 654 is transmitted without a latency error.

In many cases the two (or more) events happen randomly and this behavior is acceptable; the higher priority event frame is always transmitted at the right time. However, in some systems where a fixed relation exists between the two events it may be unacceptable that the lower priority event frame switches between being before or after the higher priority event frame. For such cases, an option may be included to turn off the prioritization that looks for other events in the pipe and just prioritize among those that are ready to be transmitted.

Figure 7:
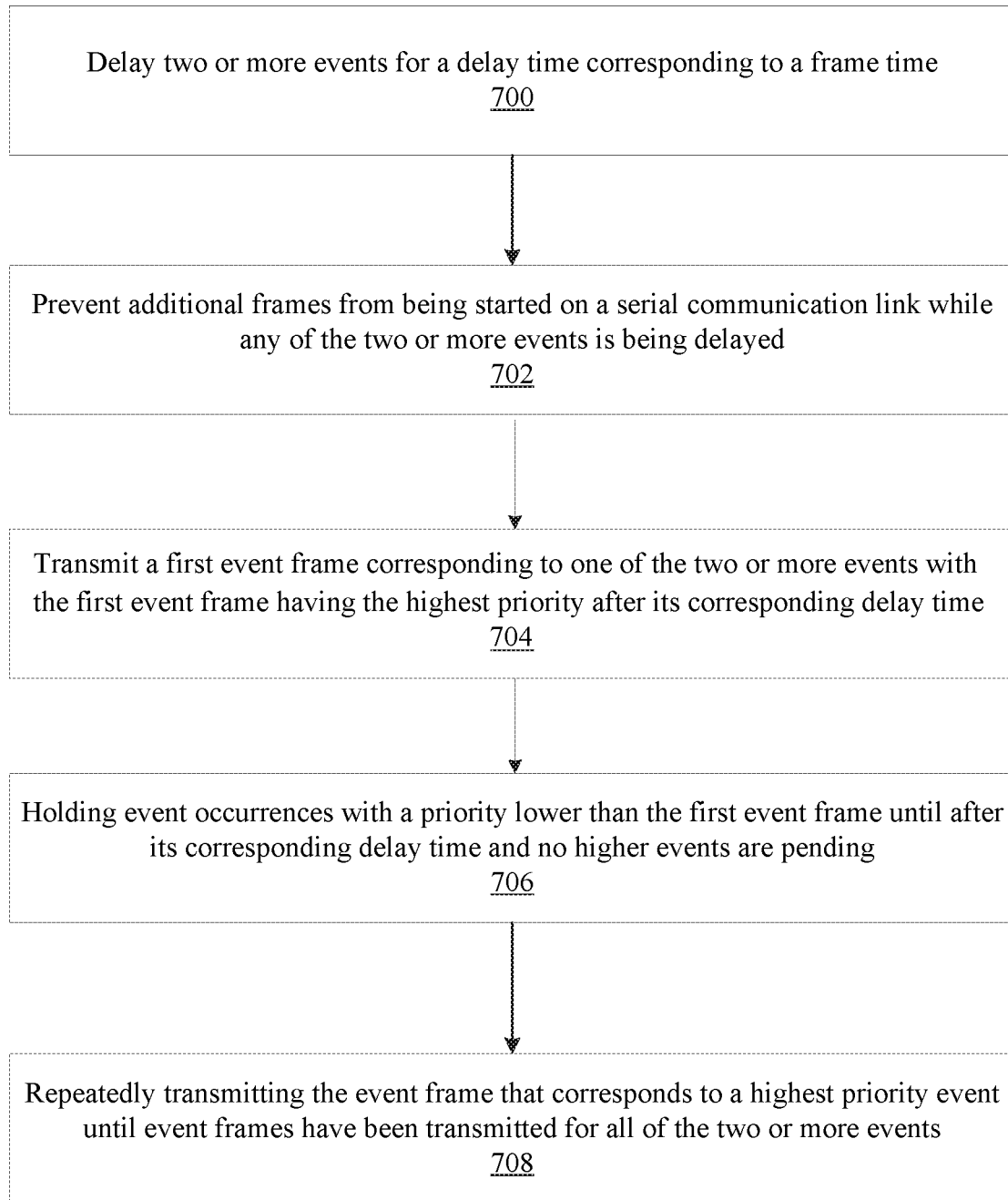
FIG. 7 shows a flowchart of a process for prioritizing events according to an embodiment of the disclosure.

FIG. 7 shows a flowchart of a process for prioritizing events according to an embodiment of the disclosure. In operation 700, two or more events are delayed for a delay time. In one embodiment, the delay time may correspond to a frame time. In operation 702, additional frames are prevented from being started on a serial communication link while any of the two or more events is being delayed. In operation 704, a first event frame is transmitted that corresponds to one of the two or more events. In one embodiment, the first event has the highest priority after its corresponding delay time. In operation 706, event occurrences that have a priority lower than the first event frame are held until after its corresponding delay time and no higher events are pending. In operation 708, the event frame(s) that correspond(s) to a highest priority event is repeatedly transmitted until event frames have been transmitted for all of the two or more events.

Figure 8:
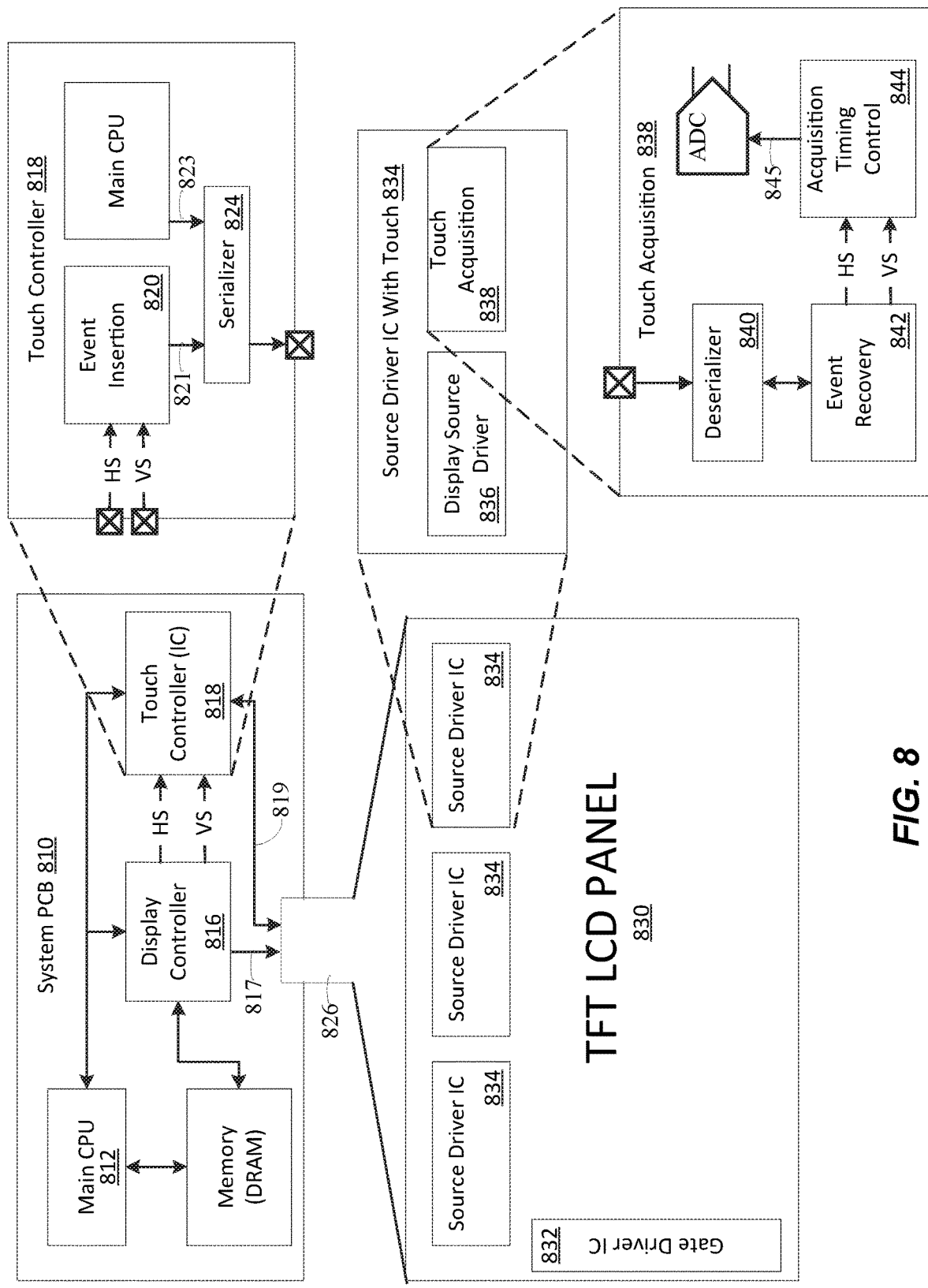
FIG. 8 shows a block diagram of a touch panel system including a system controller, a touch controller, and a display panel with serial communication links according to an embodiment of the disclosure.

FIG. 8 is a block diagram of a touch panel system including a system controller, a touch controller, and a display panel with serial communication links according to an embodiment of the present disclosure.

In this system, a serial bus is used to distribute Vertical Synchronization (VS) and Horizontal Synchronization (HS) event information from the display controller 816 to all of the touch acquisition sub-systems via a single control line 817, which is also used for data/control transfers. As an example, the control line 817 might be the Master TxD of a USART channel, which is used to send configuration data to the source Driver ICs 834, and get Analog-to-Digital Control (ADC) samples representing touch data in return on the RxD line. The system Printed Circuit Board (PCB) 810 may be, for instance, a mobile phone, tablet, or any other system with a display, which supports touch sensing. As an example, the system PCB 810 may be connected to the TFT LCD panel 830 using a flexible printed circuit board 826, and the source driver ICs 834 may be mounted on the glass using silver epoxy. For some touch solutions, touch acquisition front-end 838 may be split and implemented on the display source driver ICs 834. The measurements may then be transferred back to the touch controller 818 via line 819 where the Central Processing Unit (CPU) 812 (and possible Digital Signal Processing (DSP) unit) performs a post-processing operation to filter noise and determine, for example, whether someone touches the screen with one or more fingers, or if some other touch event occurred.

The display controller 816, display source driver 836, and gate driver circuitry 832 in this embodiment may be totally unaware of the touch system. The display controller 816 controls the screen updating via control line 817. However, for the touch system it may be important to accurately synchronize its acquisition 845 to the control line 817 to avoid the noise from the source driver 834 ICs and gate driver 832 ICs. The touch controller 818 IC receives the HS/VS signals (i.e., events) from the display controller 816, and the event insertion logic 820 prioritizes these events. In one embodiment, the event insertion logic 820 may implement embodiments of a delay circuit and priority logic, such as a delay circuit 520 and priority logic 510 (FIG. 5). In one embodiment, the event insertion logic 820 may implement one or more of the processes for uniform delay described with references to FIGS. 1A-3. Embodiments of touch controller 818 IC may then translate the events into "frames" or "packages" before inserting these frames into a serial stream. In various embodiments, serializer 824 (Tx) will send event frames 821 before data frames 823 (i.e., data frames have lowest priority). The touch acquisition front-end 838 in the source driver ICs 834 will de-serialize (deserializer 840) the serial stream and recover/decode the HS/VS events (event recovery 842) before passing them to the timing and control acquisition 844 stage.

It should be noted that FIG. 8 is discussed as one example of system in accordance with embodiments of the present disclosure. One of ordinary skill in the art will appreciate that there are many other systems where there is a need to transmit timing details or other event details as additional "side information" relative to the regular data transmitted on serial communication links, and such systems may use embodiments of the present disclosure.

As a non-limiting example of event prioritization with touch displays, VSYNC is sent for each new image update, while there are several HSYNCs between each VSYNC, representing new lines within the same image. The prioritizing logic ensures that even if VSYNC and HSYNC appear simultaneously (which is the case in some systems), VSYNC should be assigned the higher priority and will win. However, if an HSYNC appears one USART frame before the VSYNC, jitter in the sampling time will determine whether both are transmitted without errors (if the lower priority HSYNC is detected first) or the higher-priority VSYNC is transferred first, with an error identification on the later occurring event. In either option A or option B, the higher priority VSYNC is always transmitted at the right time, but it might be confusing if an HSYNC belonging to the previous image comes after the VSYNC (and hence a new image)—even if it has an error identification. The timing between HSYNC and VSYNC is application specific—in one particular display it will always behave the same way, and the same behavior should always be expected in the system. Hence, there may be applications where the prioritizing (at least for these two events) should be turned off—in the sense that the lower-priority event (HSYNC) is discarded if it arrives while the higher-priority VSYNC is being transmitted.

Many of the functional units described in this specification may be described as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable state machines, programmable logic devices, or the like.

Modules may also be implemented using software, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM), which may store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

Additional non-limiting embodiments of the disclosure include:

Embodiment 1

A serial communication link receiver, comprising: receive circuitry configured to receive an event frame, wherein the event frame includes delay bits indicative of a delay between an event that occurred at a transmitter relative to a predefined bit position in a previous frame received from the transmitter; and delay circuitry configured to: decode the delay bits; wait a number of clock cycles corresponding to the delay bits; and assert a receiver-side event after waiting the number of clock cycles.

Embodiment 2

The serial communication link receiver according to embodiment 1, wherein the delay circuitry is configured to wait by counting the number of clock cycles starting at a predefined point in the event frame.

Embodiment 3

The serial communication link receiver according to any one of Embodiments 1 or 2, wherein the predefined point in the event frame is the last bit of the event frame.

Embodiment 4

The serial communication link receiver according to any one of Embodiments 1 through 3, wherein the receiver-side event corresponds to the event that occurred at the transmitter.

Embodiment 5

The serial communication link receiver according to any one of Embodiments 1 through 4, wherein the delay bits correspond to no delay.

Embodiment 6

The serial communication link receiver according to any one of Embodiments 1 through 5, wherein the delay circuitry is configured to decode event indicator bits and assert the receiver-side event responsive to the event indicator bits, wherein the event indicator bits indicate which event of a set of events the event frame corresponds to.

Embodiment 7

The serial communication link receiver according to any one of Embodiments 1 through 6, wherein the delay circuitry is configured to decode frames based on a protocol selected from a group consisting of a Universal Asynchronous Receiver/Transmitter, a Universal Synchronous Receiver/Transmitter, or a Universal Synchronous/Asynchronous Receiver/Transmitter.

Embodiment 8

A method of receiving events over a serial communications link, comprising: receiving an event frame; decoding delay bits from the event frame, the delay bits indicative of a delay between an event that occurred at a transmitter relative to a predefined bit position in a previous frame; waiting a number of clock cycles corresponding to the delay bits; and asserting a receiver-side event after the waiting.

Embodiment 9

The method according to Embodiment 8, wherein waiting the number of clock cycles corresponding to the delay bits comprises counting the number of clock cycles from a predefined point in the event frame.

Embodiment 10

The method according to any one of Embodiments 8 or 9, wherein the predefined point in the event frame is the last bit in the event frame.

Embodiment 11

The method according to any one of Embodiments 8 through 10, further comprising: decoding event indicator bits from the event frame, wherein the event indicator bits indicate which event of a set of events the event frame corresponds to; and wherein asserting the receiver-side event is responsive to the event indicator bits.

Embodiment 12

The method according to any one of Embodiments 8 through 11, wherein the event frame is received back-to-back with the previous frame.

Embodiment 13

The method according to any one of Embodiments 8 through 11, wherein the delay bits are indicative of no delay.

What is claimed is:

1. A serial communication link receiver, comprising:
   receive circuitry configured to receive an event frame, wherein the event frame includes delay bits indicative of a delay between an event that occurred at a transmitter relative to a predefined bit position in a previous frame received from the transmitter; and
   delay circuitry configured to:
      decode the delay bits;
      wait a number of clock cycles corresponding to the delay bits; and
      assert a receiver-side event after waiting the number of clock cycles.

2. The serial communication link receiver of claim 1, wherein the delay circuitry is configured to wait by counting the number of clock cycles starting at a predefined point in the event frame.

3. The serial communication link receiver of claim 2, wherein the predefined point in the event frame is the first or last bit of the event frame.

4. The serial communication link receiver of claim 1, wherein the receiver-side event corresponds to the event that occurred at the transmitter.

5. The serial communication link receiver of claim 1, wherein the delay bits correspond to no delay.

6. The serial communication link receiver of claim 1, wherein the delay circuitry is configured to decode event indicator bits and assert the receiver-side event responsive to the event indicator bits, wherein the event indicator bits indicate which event of a set of events the event frame corresponds to.

7. The serial communication link receiver of claim 1, wherein the delay circuitry is configured to decode frames based on a protocol selected from a group consisting of a Universal Asynchronous Receiver/Transmitter, a Universal Synchronous Receiver/Transmitter, or a Universal Synchronous/Asynchronous Receiver/Transmitter.

8. The serial communication link receiver of claim 1, wherein the delay circuitry is configured to decode in the event frame one or more error bits indicative of whether the event frame was delayed for a period longer than a frame time.

9. The serial communication link receiver of claim 1, wherein the delay circuitry is configured to decode an error signature encoded in the delay bits, the error signature corresponding to a delay time longer than a frame time.

10. A method of receiving events over a serial communications link, comprising:
receiving an event frame;
decoding delay bits from the event frame, the delay bits indicative of a delay between an event that occurred at a transmitter relative to a predefined bit position in a previous frame;
waiting a number of clock cycles corresponding to the delay bits; and
asserting a receiver-side event after the waiting.

11. The method of claim 10, wherein waiting the number of clock cycles corresponding to the delay bits comprises counting the number of clock cycles from a predefined point in the event frame.

12. The method of claim 11, wherein the predefined point in the event frame is a first bit in the event frame.

13. The method of claim 10, further comprising:
decoding event indicator bits from the event frame, wherein the event indicator bits indicate which event of a set of events the event frame corresponds to; and
wherein asserting the receiver-side event is responsive to the event indicator bits.

14. The method of claim 10, wherein the event frame is received back-to-back with the previous frame.

15. The method of claim 10, wherein the delay bits are indicative of no delay.

16. The method of claim 10, further comprising decoding one or more error bits from the event frame, the error bits indicative of whether the event frame was delayed for a period longer than a frame time.

17. The method of claim 10, further comprising, decoding an error signature encoded in the delay bits, the error signature corresponding to a delay time longer than a frame time.

* * * * *